United States Patent
Mori et al.

[11] Patent Number: 5,969,322
[45] Date of Patent: Oct. 19, 1999

[54] APPARATUS HAVING A FILM CONDITION JUDGING DEVICE

[75] Inventors: Nobuyuki Mori, Sakai; Hidekazu Nakajima, Higashioska, both of Japan

[73] Assignee: Minolta Co., Ltd., Osaka, Japan

[21] Appl. No.: 08/901,413

[22] Filed: Jul. 28, 1997

[30] Foreign Application Priority Data

Jul. 29, 1996 [JP] Japan ................................ 8-216804
Jul. 29, 1996 [JP] Japan ................................ 8-216805

[51] Int. Cl.⁶ ........................... G06K 7/10; G06K 17/00
[52] U.S. Cl. .................. 235/462.01; 235/375; 235/494; 396/284; 396/515
[58] Field of Search ...................... 235/462.01, 462.02, 235/462.03, 462.04, 462.05, 375, 494; 396/207, 284, 515, 390

[56] References Cited

U.S. PATENT DOCUMENTS

| | | | |
|---|---|---|---|
| 4,422,745 | 12/1983 | Hopson | 235/462.01 |
| 4,586,800 | 5/1986 | Tominaga et al. | 354/21 |
| 4,994,833 | 2/1991 | Cocca | 345/207 |
| 5,030,978 | 7/1991 | Stoneham et al. | 354/21 |
| 5,032,854 | 7/1991 | Smart et al. | 354/21 |
| 5,128,519 | 7/1992 | Tukuda | 235/462.01 |
| 5,264,683 | 11/1993 | Yoshikawa | 235/93 |
| 5,278,600 | 1/1994 | Takahashi et al. | 354/275 |
| 5,321,455 | 6/1994 | Cocca | 354/207 |
| 5,347,334 | 9/1994 | Smart et al. | 354/275 |
| 5,475,454 | 12/1995 | Ezawa | 354/21 |
| 5,701,539 | 12/1997 | Amano | 396/515 |
| 5,802,411 | 9/1998 | Wakabayashi et al. | 396/389 |

*Primary Examiner*—Donald Hajec
*Assistant Examiner*—Daniel St. Cyr
*Attorney, Agent, or Firm*—Burns, Doane, Swecker & Mathis, LLP

[57] ABSTRACT

In an apparatus having a film condition judging device which judges a film condition based on data obtained by reading out bar codes of a bar code disk equipped on a film cartridge, wherein the bar code disk is initially stopped at a predetermined rotational position in response to the film condition, signals which are output from a sensor, are detected at plurality of times during a bar code disk rotation, and so inclinations in changes of the sensor's output are detected, thereby an error signal is distinguished from a correct signal according to the inclinations in the changes. Further, a sensor's output as a correct signal is counted, then the used condition of the film is judged based on the counted value of the sensor's output. Thus, even if there occurs an unstable rotation of the bar code disk, which brings the error signal, the film condition can be correctly judged by one sensor.

27 Claims, 19 Drawing Sheets

APPARATUS HAVING A FILM CONDITION JUDGING DEVICE

BACKGROUND OF THE INVENTION

This invention relates to an apparatus having a film condition judging device in which bar codes of the film cartridge are read out by a sensor, and the used condition of a film is judged based on output from the sensor.

Conventionally, in an apparatus such as a camera which uses a film cartridge (a film is contained therein) having a bar code disk in which data on a film is recorded, it has been known that, after loading the film cartridge in the camera, bar codes of the bar code disk are read out by sensors equipped in the camera, and the film's used condition (exposed, unexposed, etc.) is judged by output from the sensors, and then operations in the camera are controlled depending on the film's used condition. In order to judge the film condition, two sensors which monitor a different position of the bar code disk, have been generally used.

In the above-mentioned conventional method, however, it is true that the film condition can be correctly judged, but on the other hand, two sensors are needed, which requires two sensor driving circuits and two sensor's output detecting circuits, so its costs are to be raised.

Theoretically, it seems possible to practice a method of judging the film condition by one sensor. However, if the above-mentioned method is applied, after a motor for feeding the film is ON, friction between a driving shaft linked with a motor and a spool shaft of the film cartridge may make a rotation of the bar code disk unstable before they engage with each other to rotate the bar code disk. Thereby the sensor may erroneously read out the bar codes, and so give an error signal. Thus, in the method of judging the film condition by one sensor, it is difficult to correctly judge the film condition.

SUMMARY OF THE INVENTION

This invention is made to solve the above-mentioned problems. An object of the present invention is to provide an apparatus having a judging device, wherein the film condition is correctly judged by one sensor, which makes it possible to reduce its costs.

Another object of the present invention is to provide an apparatus having a film condition judging device wherein, even if the sensor gives an error signal because of an unstable rotation of the bar code disk, the error signal is distinguished from a correct signal by detecting sensor's output signals at plurality of stages, and so detecting inclinations in changes of the output signals.

A further object of the present invention is to provide an apparatus having a film condition judging device which judges a film condition based on the number of bar codes which are detected until the non-indication zone is detected, wherein, the film condition is correctly judged because a first detected non-indication zone is confirmed in some prescribed cases by detecting the bar codes until a second non-indication zone is detected.

According to one aspect of the present invention, an apparatus having a film condition judging device which judges a film condition based on data obtained by reading out bar codes of a bar code disk equipped on a film cartridge, wherein the bar code disk is initially stopped at a predetermined rotational position in response to the film condition, comprises a reading out sensor which reads out the bar codes of the bar code disk, an inclination detector which detects output from the reading out sensor at plurality of times during rotation of the bar code disk, and detects inclinations in changes of the sensor's output based on the detected sensor's output and intervals between the detecting stages, a counter which counts the sensor's output as a correct signal in the case that the inclination which is detected by the inclination detector, is a prescribed value or more, and on the other, does not count the sensor's output in the case that the inclination is less than the prescribed value, and a judging device which judges the film condition based on a counted value by the counter.

In the above-mentioned construction, since the bar code disk of the film cartridge is set so as to stop at a different position depending on the film condition, the film condition can be judged based on the sensor's output which is counted as mentioned previously. Due to the operation as described above, the error judgment can be prevented even though there occurs the unstable rotation of the bar code disk immediately after the bar code disk is started to rotate by a motor. Thus, in the method of judging the film condition by one sensor, the film condition can be correctly judged.

Further, according to another aspect of the present invention, an apparatus having a film condition judging device which judges a film condition based on data obtained by reading out bar codes of a bar code disk equipped on a film cartridge, wherein the bar code disk is initially stopped at a predetermined rotational position in response to the film condition, comprises a motor rotation amount detector which detects a rotation amount of a motor which drives the bar code disk, and an inclination detector which detects output from the reading out sensor at plurality of times during rotation of the bar code disk, and detects inclinations in changes of the sensor's output based on the detected sensor's output and the pulse numbers which are detected by the motor rotation amount detector.

In the above-mentioned construction, the inclinations in changes of the sensor's output are detected based on the sensor's output detected at plurality of times and the pulse numbers which are detected by the motor rotation amount detector. Therefore, the inclinations in changes of the sensor's output are correctly detected regardless of a rotation speed of the motor, which makes it possible to correctly judge the film condition.

According to the further aspect of the present invention, an apparatus having a film condition judging device which judges a film condition based on data obtained by reading out bar codes of a bar code disk equipped on a film cartridge, wherein the bar code disk is initially stopped at a predetermined rotational position in response to the film condition, comprises a detector which detects a non-indication zone of the bar code disk based on a bar code signal which is output from the reading out sensor, and a judging device which judges the film condition based on the number of the bar codes detected until a first non-indication zone is detected after a motor for driving the bar code disk is ON, and confirms the judgment result based on the number of bar codes detected until a second non-indication zone is detected.

In the above-mentioned construction, when the first non-indication zone is erroneously detected, there may be a probability of indicating other than "unexposed" in the first judgment in spite the fact that the film cartridge containing the unexposed film is loaded, but due to the above-mentioned operations, the error judgment can be prevented.

DETAILED DESCRIPTION OF THE PREFERRED EMBODIMENT OF THE PRESENT INVENTION

Now, the present invention will be described in detail below with reference to the preferred embodiments illustrated in accompanying drawings.

Figure 1:
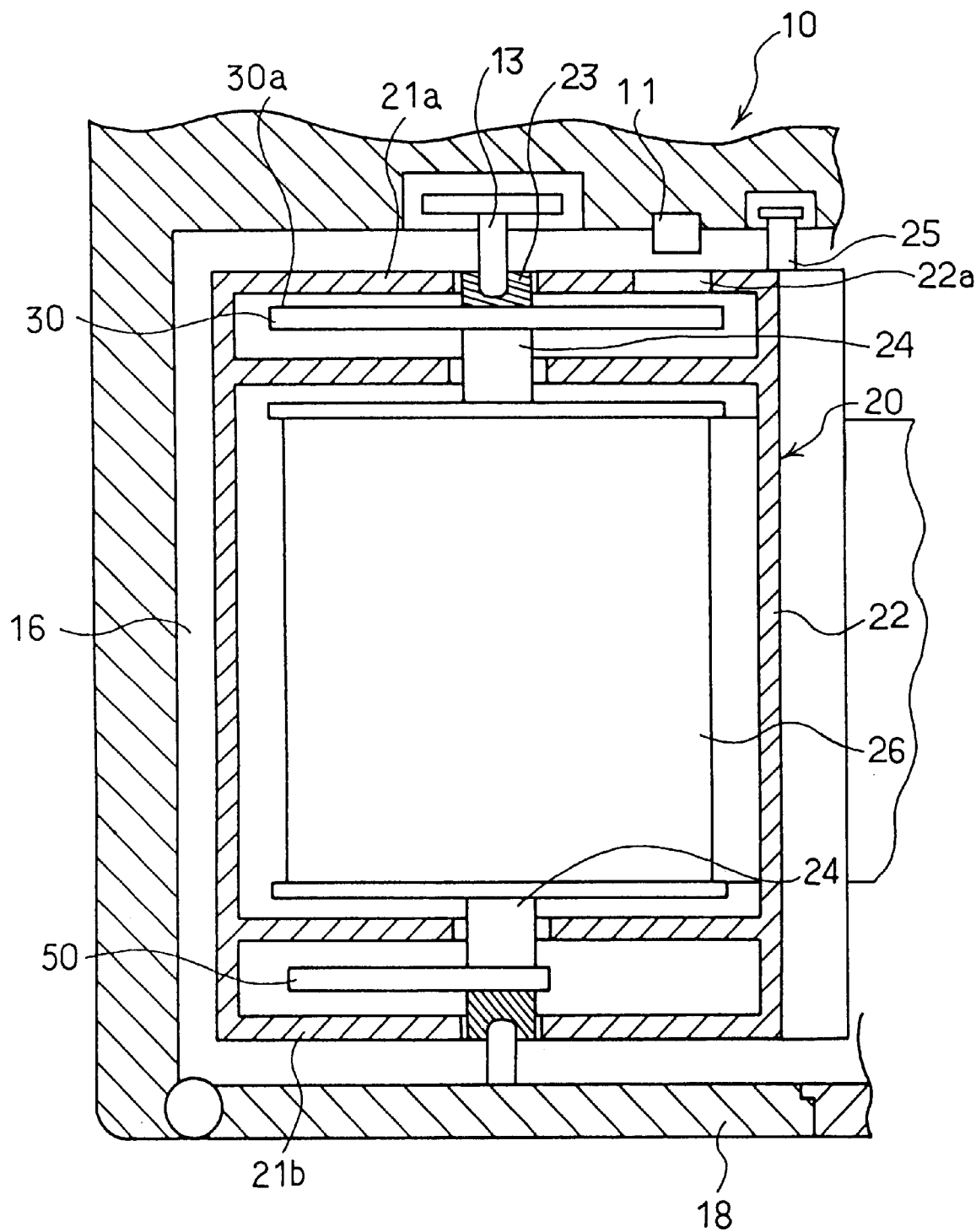
FIG. 1 is a sectional view of a main part of a camera having a film condition judging device according to the first embodiment of the present invention.
Figure 2:
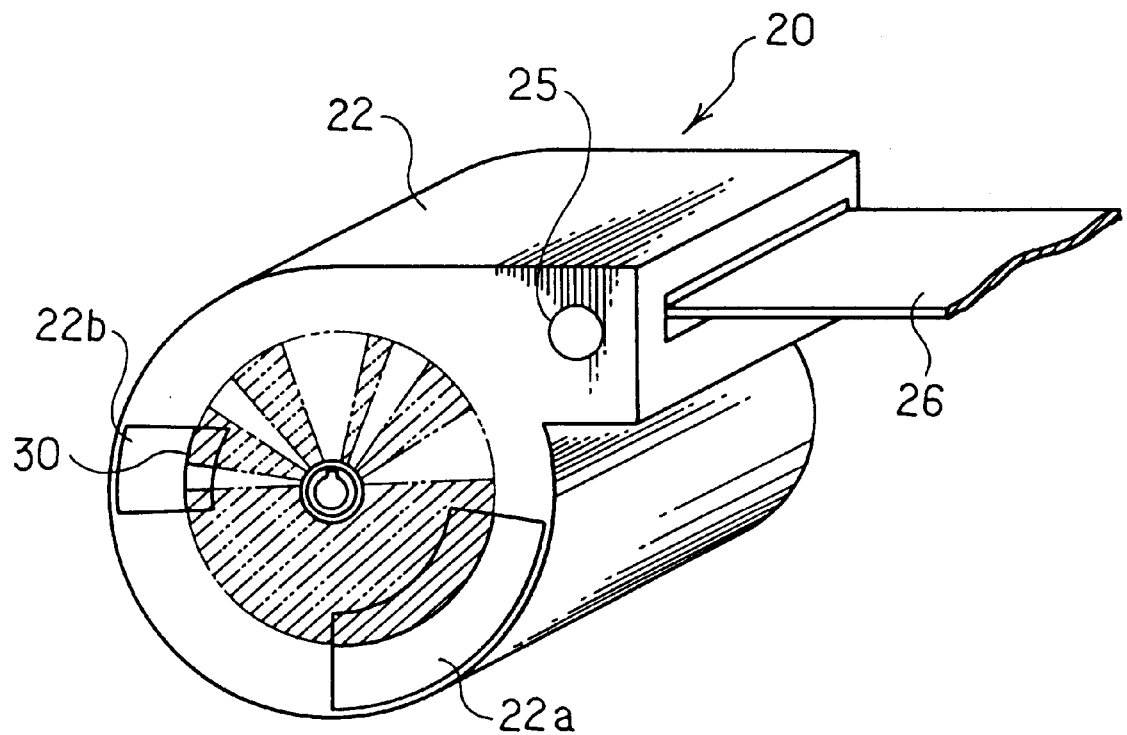
FIG. 2 is a perspective view of a film cartridge which is used in the camera.
Figure 3:
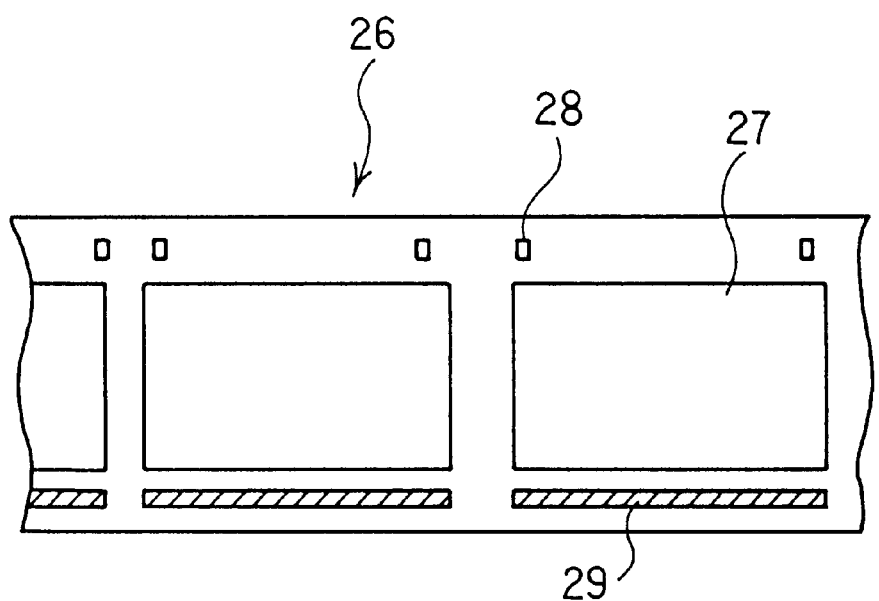
FIG. 3 is a plan view of a film in the film cartridge.

FIG. 1 shows a structure of an apparatus such as a camera having a film condition judging device in accordance with the first embodiment of the present invention, and FIG. 2 shows a film cartridge which is used in the camera, and FIG. 3 shows a plan view of a film. As is seen from these drawings, a camera 10 has a cartridge chamber 16 in which the film cartridge 20 is loaded by opening a lid 18 which is arranged at a bottom plane of the camera 10. A film cartridge 20 accommodates a film 26 inside a cartridge case 22, and the film 26 is wound around a spool shaft 24 provided in the cartridge 20. An engagement groove 23 is formed on one end of the spool shaft 24, and when the film cartridge 20 is loaded in the camera 10, the engagement groove 23 engages with a claw of a driving spool shaft 12 arranged in the camera 10. The driving spool shaft 12 is driven through a transmitting mechanism by a motor (not shown).

In the film cartridge 20, a bar code disk (hereinafter referred to as simply disk) 30 is fixed at an upper end of the spool shaft 24, and bar codes are radially formed on an upper surface 30a thereof. A film condition indicator plate (hereinafter referred to as simply indicator plate) 50 which is a fan-shaped reflector plate, is also fixed at a prescribed angle to a lower end of the spool shaft 24. The disk 30 and the indicator plate 50 rotates unitedly with the spool shaft 24 inside the case 22 of the film cartridge 20. The disk 30 and the indicator plate 50 can be seen partially from the outside through indicator windows 22a, 22b and indicator windows 52–55 formed on the cartridge case 22. The disk 30 and the indicator plate 50 are set to stop at a different position depending on the film's used condition such as exposed, unexposed, and so on (details are described later).

As shown in FIG. 3, the film 26 has perforations 28 at an upper part thereof, and magnetic recording sections 29 at a lower part thereof. Corresponding to a pair of perforations 28, one frame 27 is exposed. The frame 27 is stopped at a predetermined position by detecting the perforation 28 in use of a sensor (described later) on feeding out a frame of the film 26. The magnetic recording sections 29 have magnetic substance in which photography data can be recorded and played back by a magnetic head which is arranged in the camera 10.

A photo-reflector PR3 (13 in following FIG. 15) for detecting the perforations 28 of the film 26, and a magnetic head (66 in following FIG. 15) for recording data in the magnetic recording section 29 of the film 26 are provided in the camera 10 relating to a position of an exposure frame (not shown).

The camera 10 controls a rotation of the driving spool shaft 24 so that the spool shaft 24 of the film cartridge 20 can be stopped at a prescribed position (angle), and so the disk 30 and the indicator indicates the film condition after the film cartridge 20 is taken out therefrom.

Figure 4:
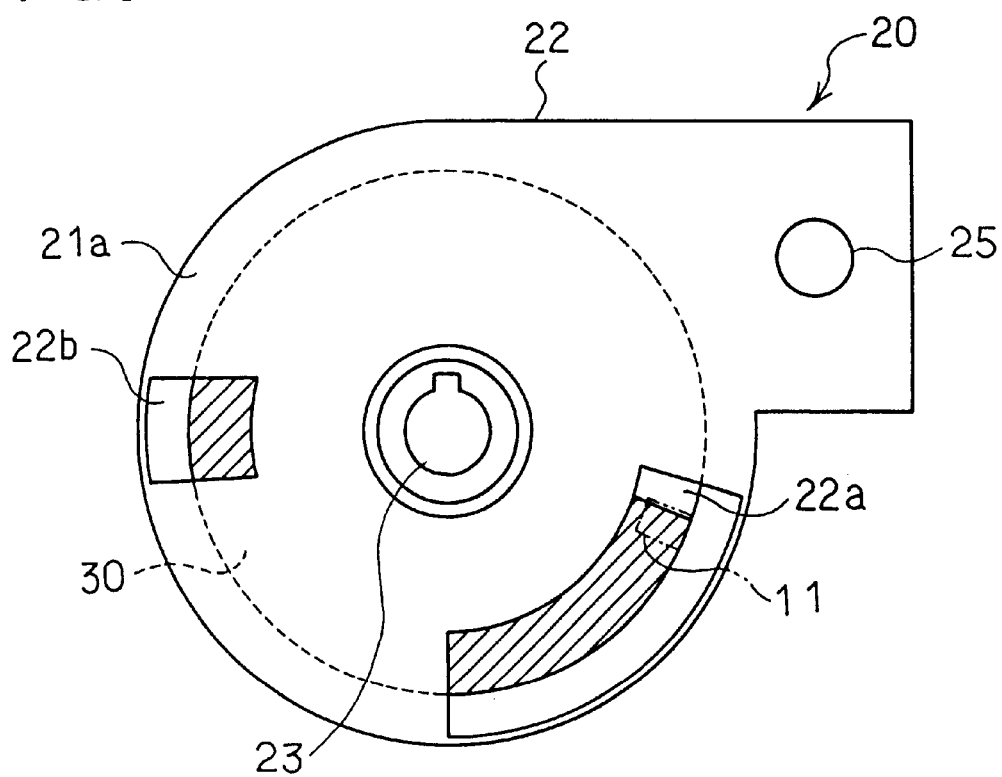
FIG. 4 is a top view of the film cartridge.

As shown in FIG. 4, the indicator windows 22a and 22b are formed on an upper plane 21a of the film cartridge 20, and an upper surface 30a of the disk 30 is partially seen therethrough. As for the disk 30, the whole disk may be disposed at the outside of the case 22. The disk 30 is fixed on the spool shaft 24, and rotates unitedly therewith, so the bar codes on the disk 30 can inform the film condition. A photo-reflector 11 (bar code reading out sensor), facing the indicator window 22a of the film cartridge 20, is arranged at the upper part of the cartridge chamber 16 of the camera 10, and reads out the bar codes on the upper surface 30a of the disk 30.

Figure 5:
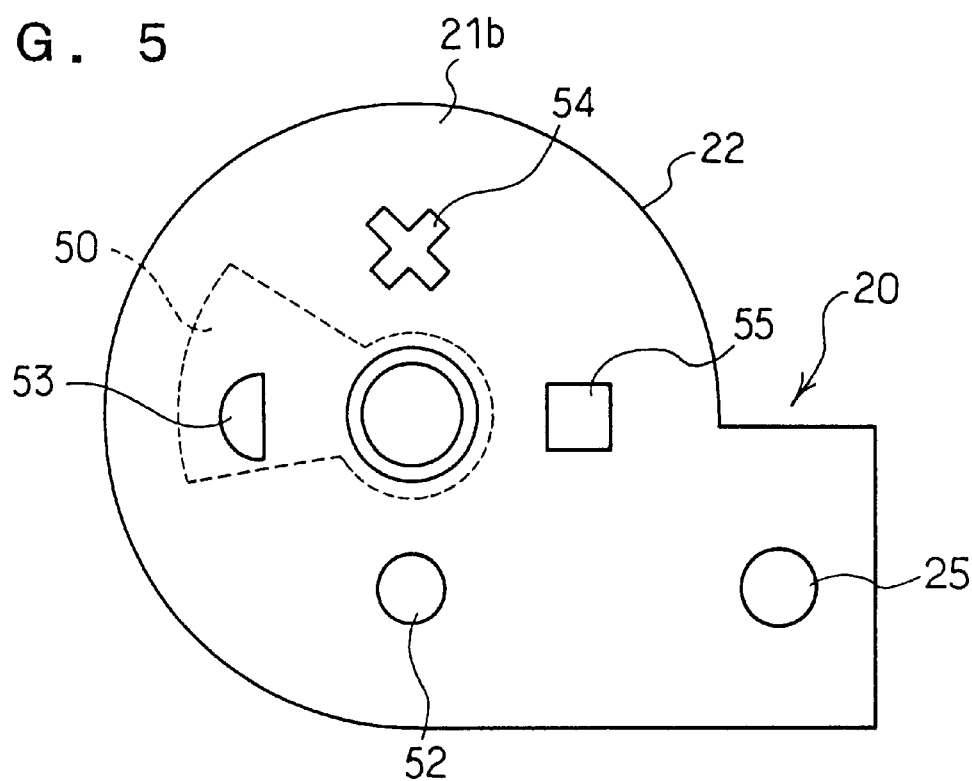
FIG. 5 is a bottom view of the film cartridge.

As shown in FIG. 5, the film cartridge 20 has four indicator windows 52, 53, 54 and 55 at its bottom plane 21b. These windows are formed at every right angle on a concentric circle, and a white-colored surface of the indicator plate 50 is seen therethrough, thereby, the film condition is indicated. Said four windows are as follows: a circular window 52 for indicating "unexposed" (the film 26 is not yet exposed at all), a semicircular window 53 for indicating "partially exposed" (some of the frames 27 of the film 26 are exposed), the X-shaped window 54 for indicating "exposed" (all of the frames 27 are exposed), and a square window 55 for indicating "developed" (the film 26 is already developed). The white colored-surface is seen through the indicator window 52, 53, 54 or 55 in the case that the indicator plate 50 is positioned therein depending on the film condition, and a black-colored one (backside view) is shown in the other case. As mentioned above, the film condition is visually informed by the position where the indicator plate 50 rotating unitedly with the shaft 24 is stopped.

Figure 6:
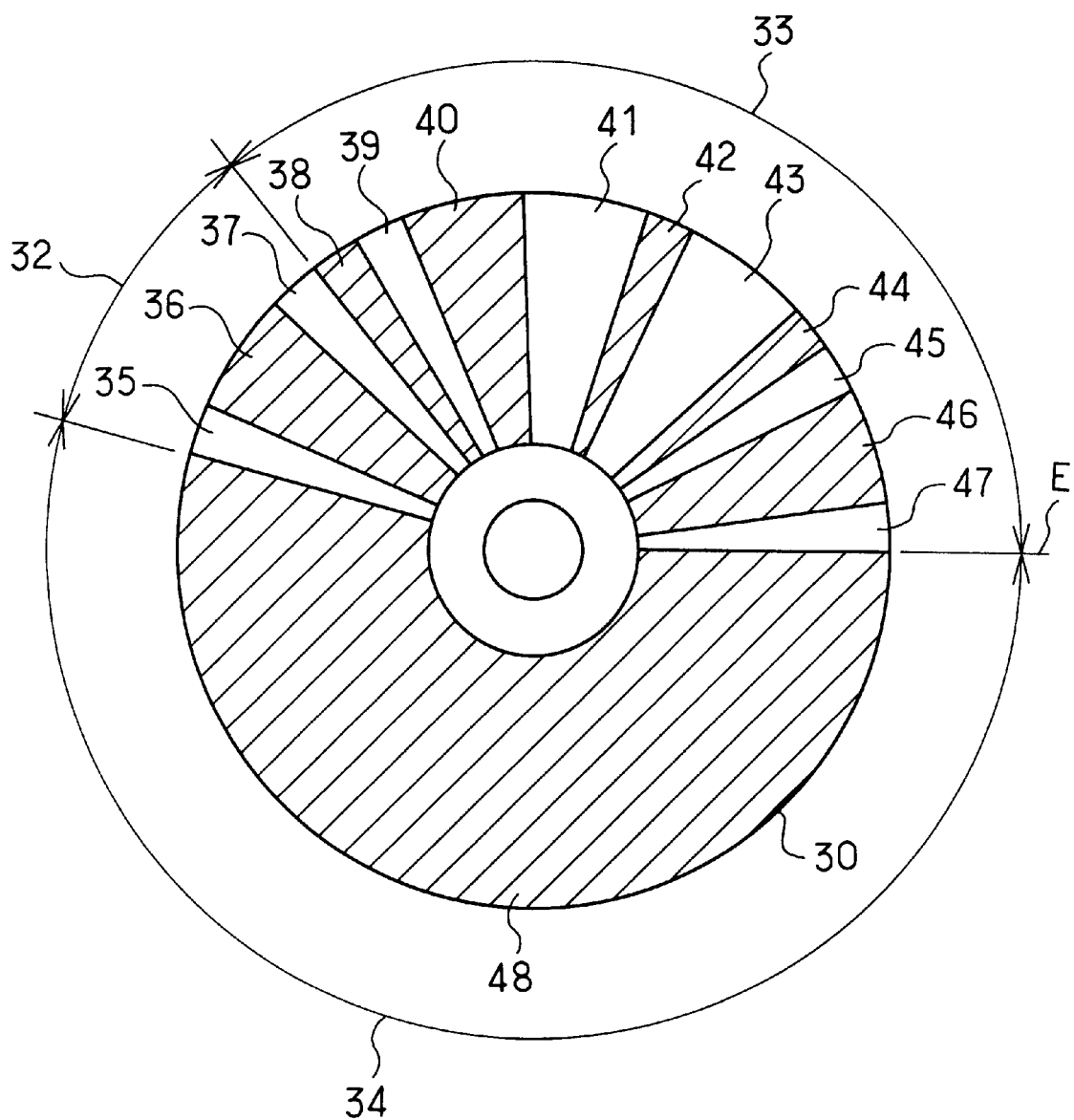
FIG. 6 is a plan view of a bar code disk of the film cartridge in the first embodiment of the present invention.

In this embodiment, as shown in FIG. 6, bar codes on the upper surface 30a of the disk 30 consist of a frame number indication zone 32 for indicating the number of the frames of the film 26, a sensitivity and type indication zone 33 for indicating a sensitivity and a type (e.g. negative/positive, color/monochrome, and etc.,) of the film, and a non-indication zone 34. The frame number indication zone 32 consists of 3 bits, of which, 2 bits are narrow spaces 35 and 37 (narrow bits of an angle of 8 degrees) shown by white-colored segments in the figure, and the other 1 bit is a wide bar 36 (a wide bit of an angle of 20 degrees) shown by a hatched segment. The sensitivity and type indication zone 33 consists of 6 narrow bits (3 narrow bars 38, 42, 44, and 3 narrow spaces 39, 45, 47) and 4 wide bits (2 wide bars 40, 46, and 2 wide spaces 41, 43). The non-indication zone 34 is composed only of a hatched segment 48. An angle of the frame number indication zone 32 is 36 degrees (=8°×2+ 20°×1). An angle of the sensitivity and type indication zone 33 is 128 degrees (=(8°×3+20°×2)×2). An angle of the non-indication zone 34 is 196 degrees (=360°−36°−128°).

In bar codes according to the modified embodiment, as shown in FIG. 7, FIG. 9, FIG. 11 and FIG. 13, the frame number indication zone 32 consists of 2 bits of the wide spaces 35 and 37, and 1 bit of the narrow bar 36. The sensitivity and type indication zone 33 consists of 6 narrow bits (3 narrow bars 40, 42, 44, and 3 narrow spaces 39, 41, 45) and 4 wide bits (2 wide bars 38, 46, and 2 wide spaces 43, 47). An angle of the frame number indication zone 32 is 48 degrees (=20°×2+8°×1). An angle of the sensitivity and type indication zone 33 is 128 degrees the same as the above-mentioned first embodiment. An angle of the non-indication zone 34 is 184 degrees (=360°−48°−128°). The above-mentioned bars and spaces of the bar codes are numbered from 35 to 47 in clockwise order for the convenience to explain.

Since both of the disk 30 and the indicator plate 50 are fixed on the spool shaft 24 in the film cartridge 20, a stopping position of the disk 30, which is determined by its rotating angle, corresponds to the film condition indication. Now, as shown in the drawings from FIG. 7 to FIG. 14, a line which links the center of the spool shaft 24 and that of a pivot 25 which opens and closes a lid (not shown) arranged at the film exit 23 of the film cartridge 20, is supposed to be a reference line L, and a border line between the sensitivity and type indication zone 33, and the non-indication zone 34 is shown by a line E, and an angle between the reference line L and the border line E is supposed to be R toward an anticlockwise direction. Relations between these zones or the border line, and the film condition indication will be explained as follows.

Figure 7:
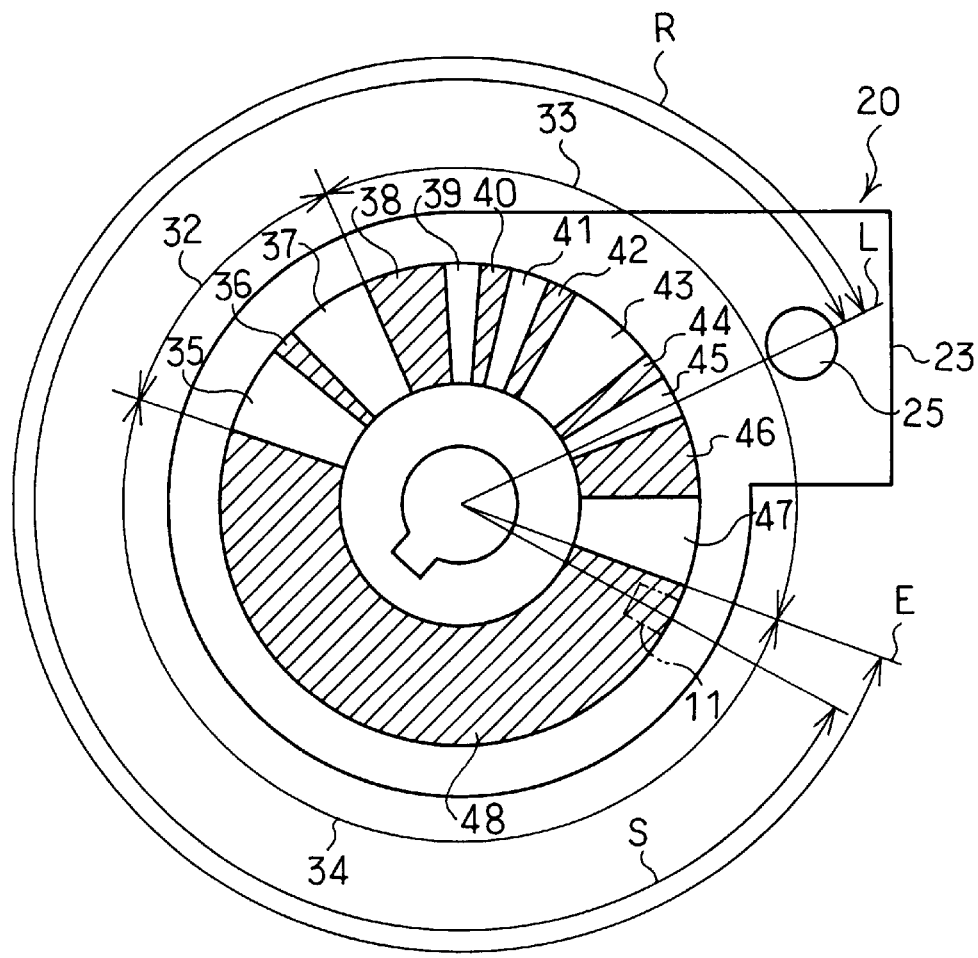
FIG. 7 is an explanatory top view of the bar code disk according to the modified embodiment (the same as following drawings from FIG. 8 to FIG. 21) of the present invention when a film is partially exposed.
Figure 8:
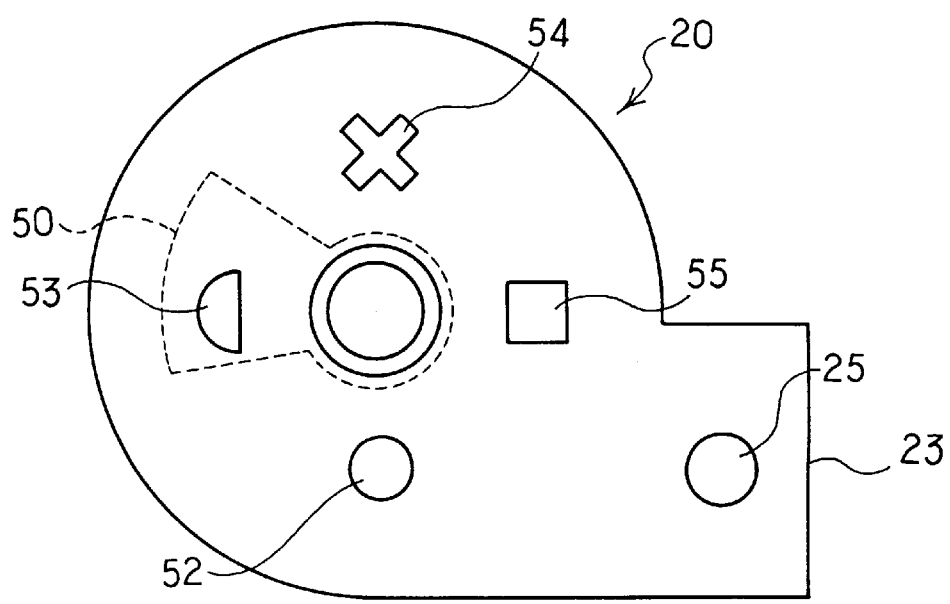
FIG. 8 is a bottom view of the film cartridge in the case shown in FIG. 7.
Figure 9:
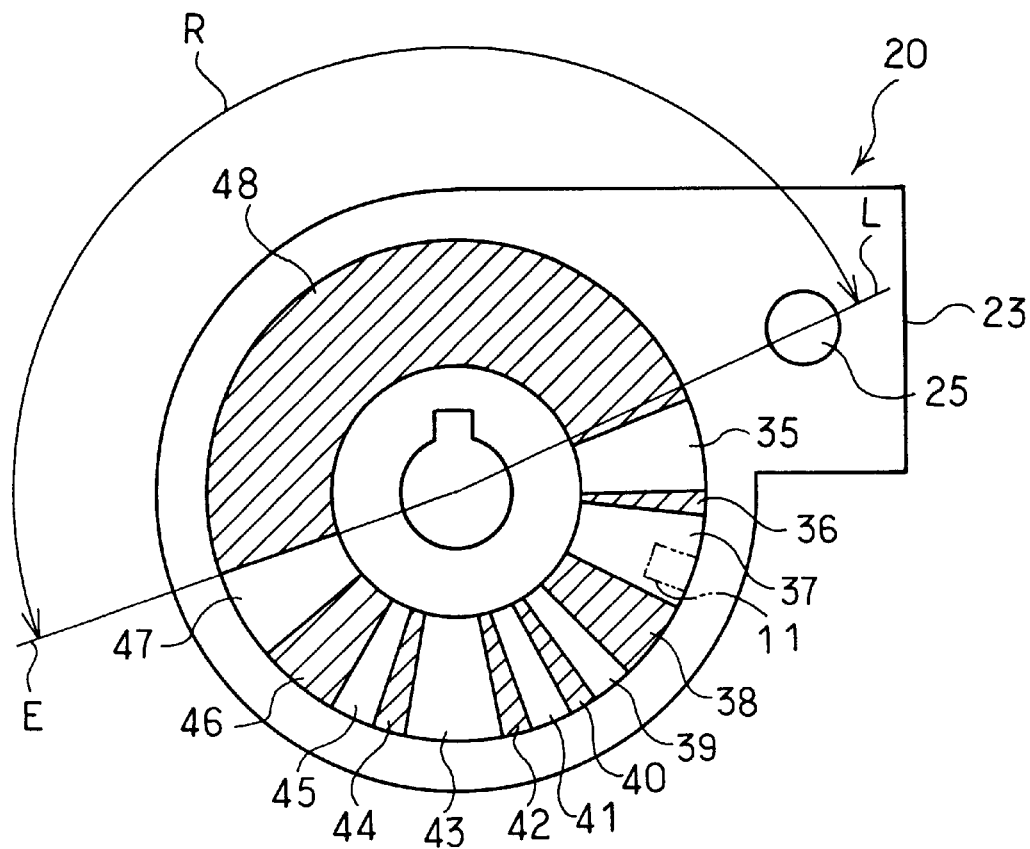
FIG. 9 is an explanatory top view of the bar code disk when the film is unexposed.
Figure 10:
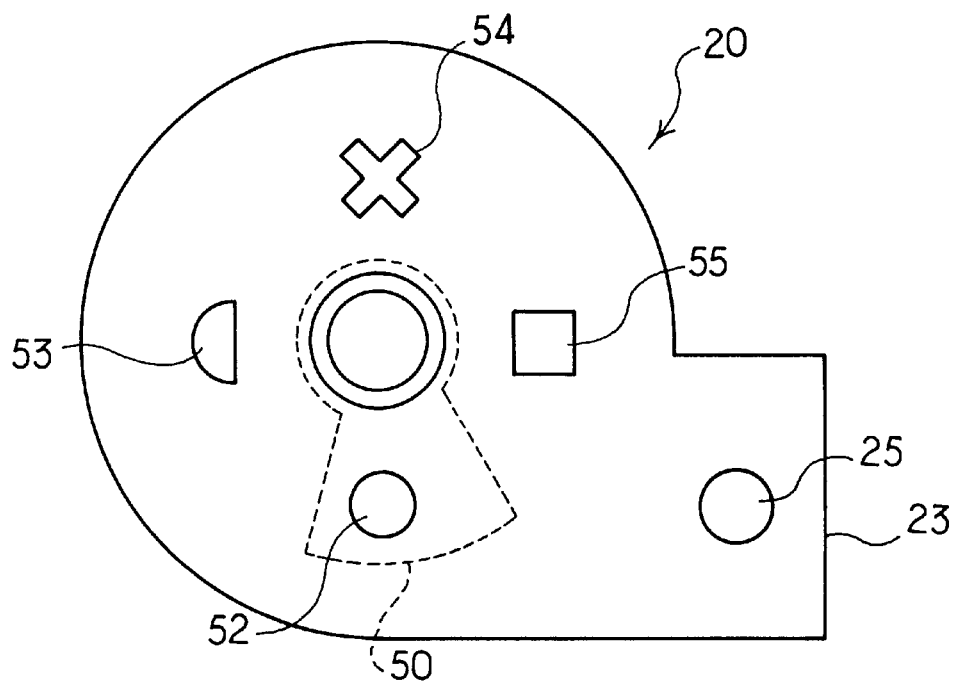
FIG. 10 is a bottom view of the film cartridge in the case shown in FIG. 9.
Figure 11:
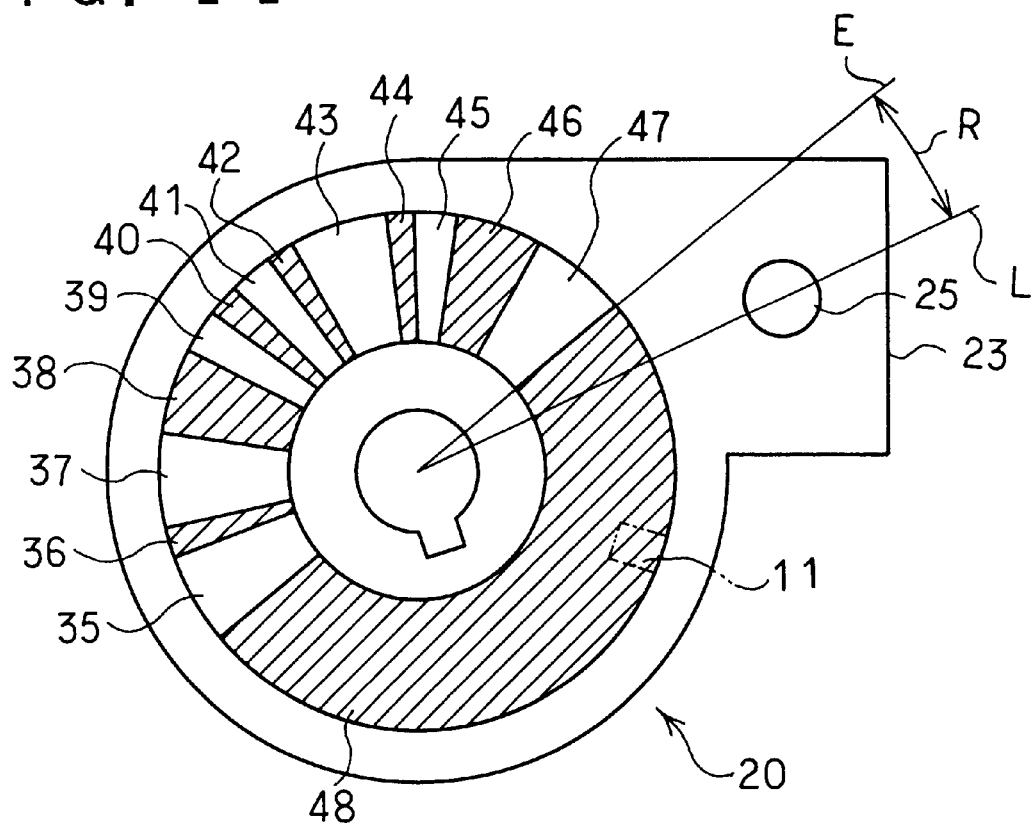
FIG. 11 is an explanatory top view of the bar code disk when the film is exposed.
Figure 12:
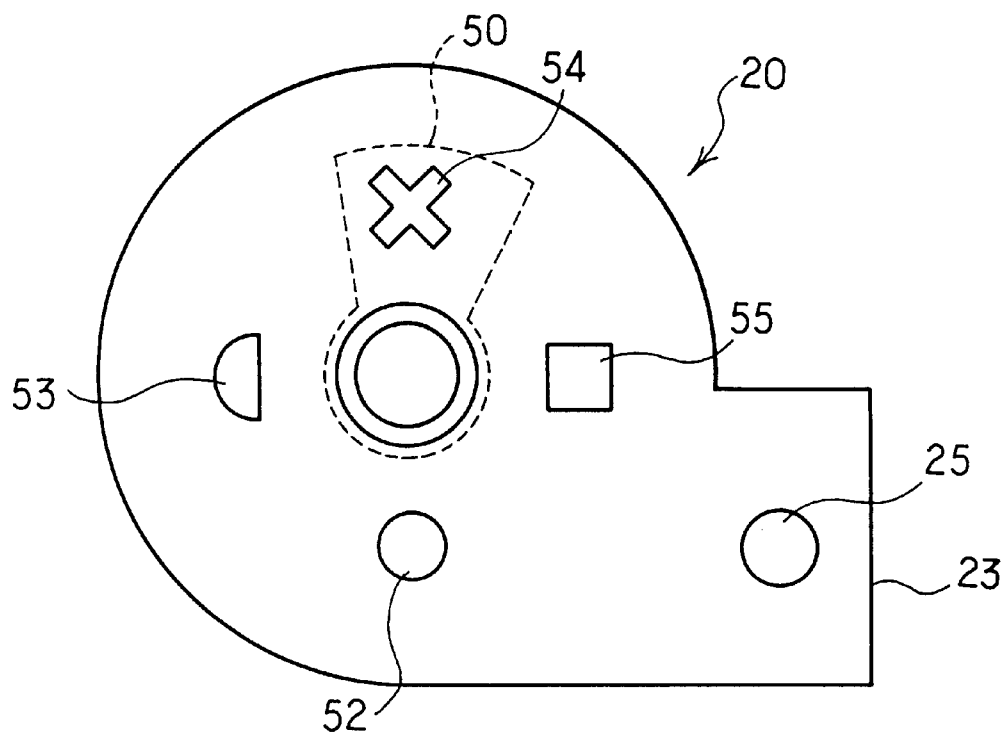
FIG. 12 is a bottom view of the film cartridge in the case shown in FIG. 11.

If the film in the film cartridge 20 is unexposed, the indicator plate 50 is positioned on the indicator window 52, which indicates the "unexposed" condition as shown in FIG. 9 and FIG. 10, and R becomes 175.5 degrees. If the film in the film cartridge 20 is partially exposed, the indicator plate 50 is in a state to indicate the "partially unexposed" condition as shown in FIG. 7 and FIG. 8, and the spool shaft 24 rotates for 139.5 degrees in a rewinding direction from the position to indicate the "unexposed" condition, so R becomes 315.0 degrees. If the film in the film cartridge 20 is exposed, the indicator plate 50 is in a state to indicate the "exposed" condition as shown in FIG. 11 and FIG. 12, and the spool shaft 24 rotates for another 63 degrees from the state to indicate the "partially exposed" condition, so R becomes 18.0 degrees. When the film in the film cartridge 20 is developed, the indicator plate 50 is in a state to indicate the "developed" condition, and the spool shaft 24 rotates for another 63 degrees from the position to indicate the "exposed" condition as shown in FIG. 13 and FIG. 14, so R becomes 81.0 degrees.

Figure 13:
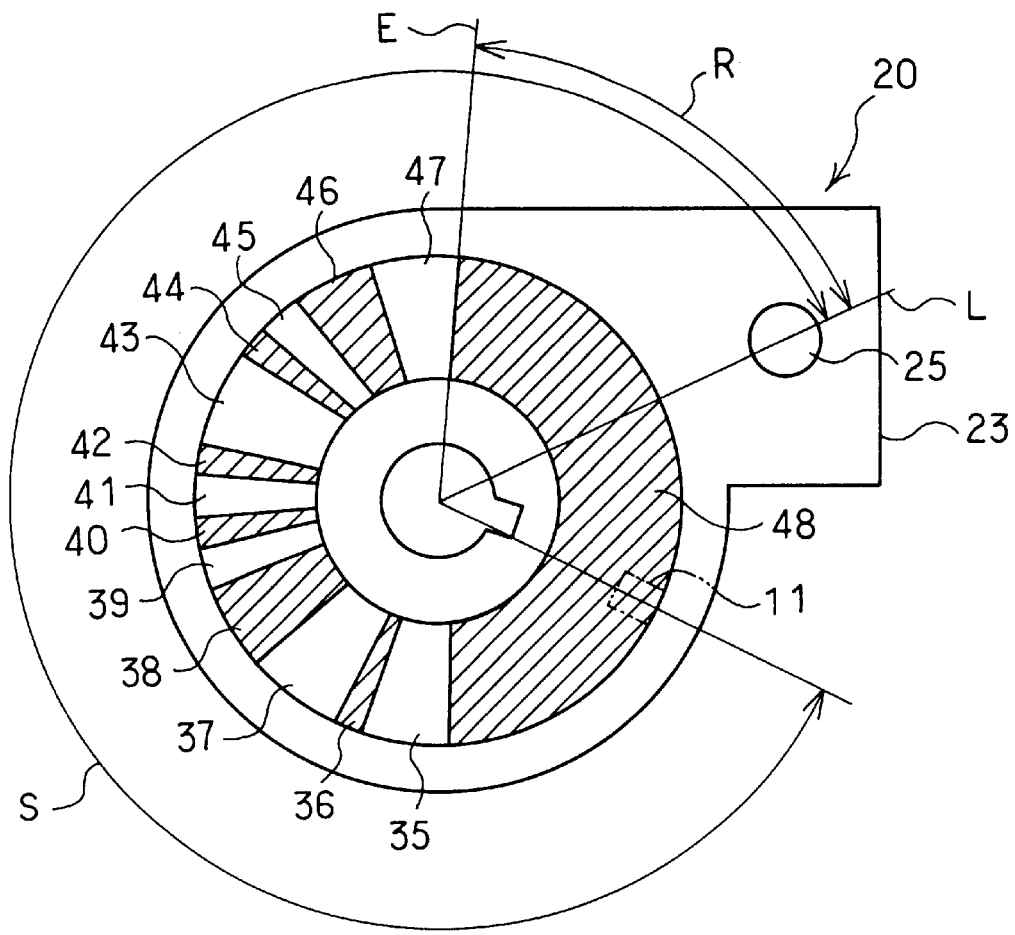
FIG. 13 is an explanatory top view of the bar code disk when the film is developed.
Figure 14:
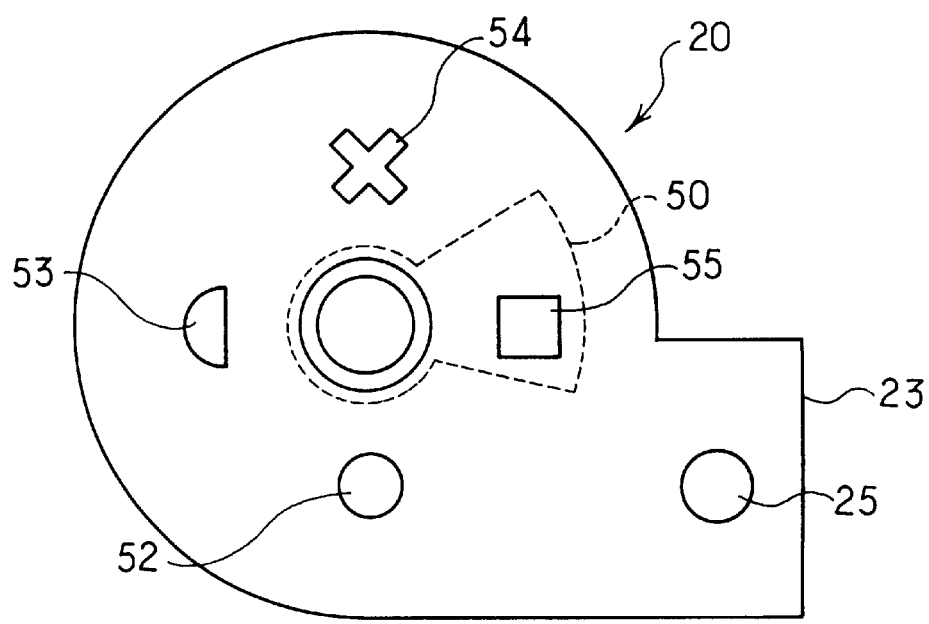
FIG. 14 is a bottom view of the film cartridge in the case shown in FIG. 13.

Besides, as shown in FIG. 7 and FIG. 13, the photo-reflector 11 is positioned so that an angle S formed from the reference line L becomes 310.75 degrees.

Figure 15:
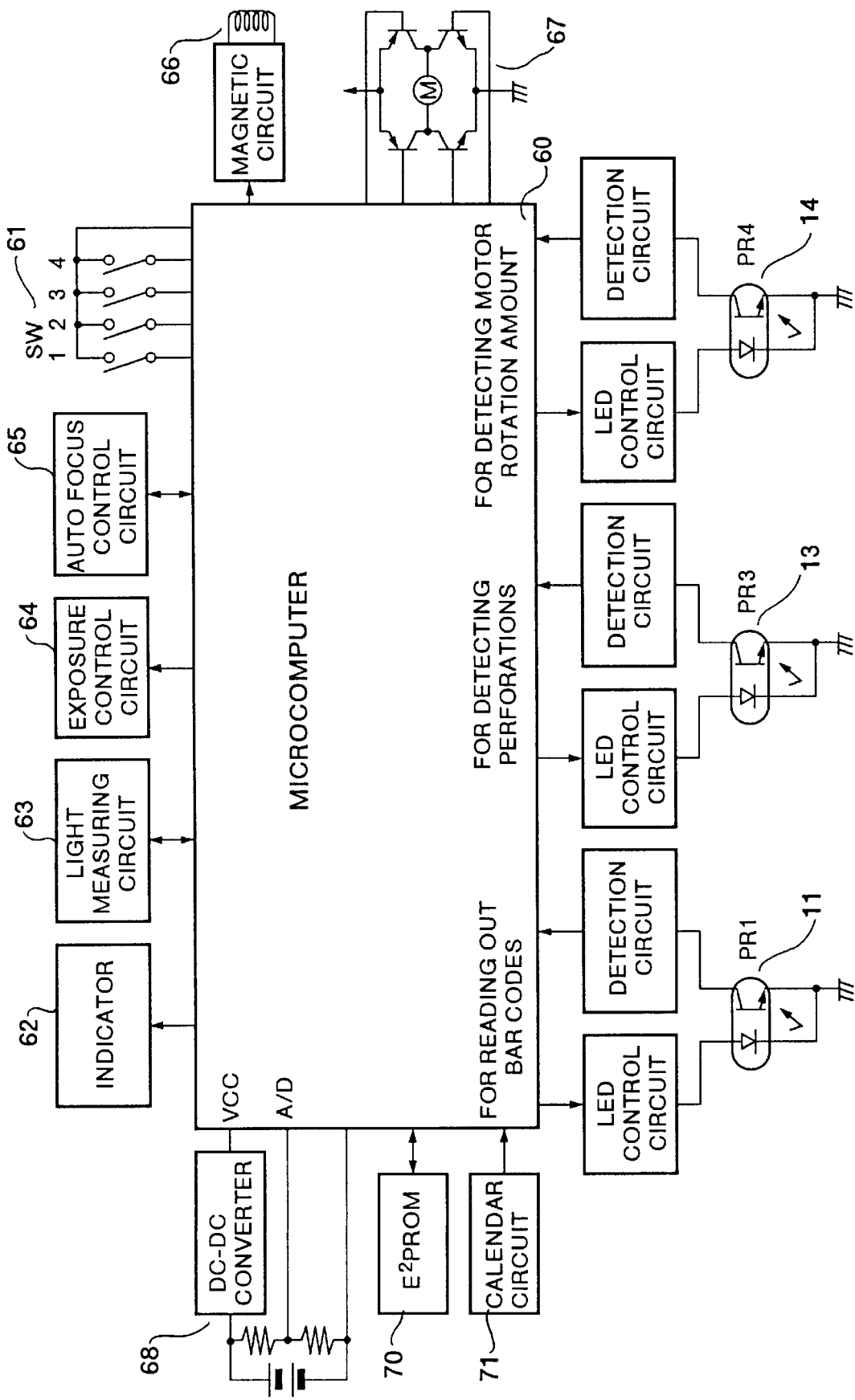
FIG. 15 is a structural view of an electrical circuit of the camera.

Now, a configuration of the electrical circuit of the camera 10 in this embodiment will be explained referring to FIG. 15. A microcomputer 60 has a central processing unit (CPU) composing a controller which controls the whole camera, a detector which detects an inclination in the sensor output, a counter which distinguishes a correct signal from an error signal, and a judging device which judges the film condition. Besides, a memory device, EEPROM (electrically erasable and programmable read only memory) 70 and a calendar circuit 71 are connected to the microcomputer 60. The EEPROM 70, used for memorizing a film condition judgment, is a write enable memory in which records are not erased even if the power is cut off. The calendar circuit 71 provides data on year, month, date, minute, second and day. Further, a power 68, an indicator 62, light measuring circuit 63, an exposure control circuit 64, an auto focus control circuit 65, a magnetic circuit and head 66, a motor driving circuit 67 for driving a motor M, and switches (SW) 61 are connected to the microcomputer 60.

The indicator 62 indicates data about the film 26, such as a type, sensitivity, the number of exposed frames, the number of unexposed frames, an alarm, a film condition judgment result and so on. The light measuring circuit 63 detects brightness of an object. The exposure control circuit 64 controls shutter speed and aperture value based on the film sensitiveness and the brightness of an object. The auto focus control circuit 65 focuses on the object. The magnetic circuit and head 66 writes data in the magnetic recording section 29 of the film 26. Four switches (SW) 61 are composed of a release switch SW1 (hereinafter referred to as simply switch SW1), a cartridge detection switch SW2 which opens or closes depending on a state whether or not the film cartridge 20 is loaded, an open/close switch SW3 which is linked with an open and close movement of the lid 18, and a halfway rewinding switch SW4 (hereinafter simply switch SW4) which rewinds the film in its halfway. The motor M executes winding up and rewinding of the film 26. The power 68 supplies an electric power to the electrical circuit.

Furthermore, the photo-reflector 11 (PR1; a sensor for reading out bar codes), a photo-reflector 13 (PR3; a detector for detecting perforations) and a photo-reflector 14 (PR4; a detector for detecting a motor rotation amount) are connected to the microcomputer 60 through a light emitting diode (LED) control circuit and a detection circuit.

Figure 16:
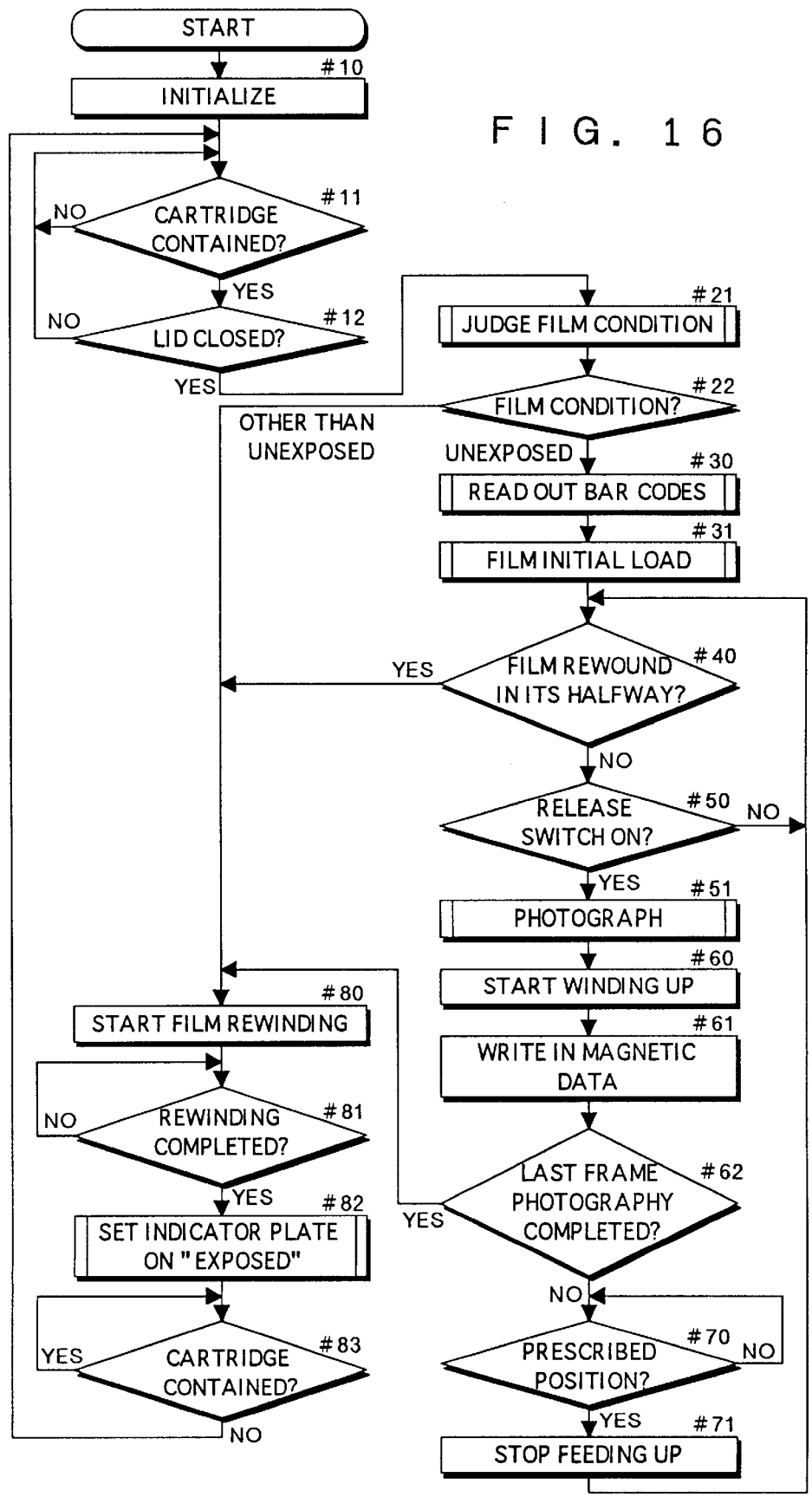
FIG. 16 is a whole flow chart showing operations of the camera.

Now, the operation of the camera 10 will be described in detail with reference to flow charts of the drawings from FIG. 16 to FIG.18. A flow chart of FIG. 16 shows a following process: after being initialized (step #10), the camera 10 stands by until the film cartridge 20 is loaded therein (#11) and the lid 18 is closed (#12). After the film cartridge 20 is loaded and the lid 18 is closed, an operation by the film condition judging device is executed (#21 and #22). If the film condition is judged "unexposed", the bar codes are read out (#30), and the film 26 is fed out to a leading first frame (#31). Then, if the switch SW4 is pressed (YES in #40), the film 26 in the film cartridge 20 is rewound, and the "exposed" is indicated (from #80 to #82).

After the switch SW1 is closed by pressing the shutter release button (YES in #50), a photographing operation is executed (#51). That is, focusing on the object, the shutter speed and the aperture value are determined based on the data from the light measuring circuit 63 and the film sensitivity data, and then the film 26 is exposed. Following the photographing operation, the film 26 is fed out (#60). While feeding out the film as mentioned above, data are written in the magnetic recording section 29 of the film 26 (#61). Said data concern the date, shutter speed, aperture value and so on. In the case that the exposed frame is a last one (YES in #62), the film 26 is rewound, and the spool shaft 24 is stopped at the position for indicating "exposed" (#82). If it is not the last one (NO in #62), the film feeding out is stopped (#71) at the time when the film 26 is fed to a next frame (#70). The film 26 is stopped when the photo-reflector 13 detects the second perforation 28.

The motor of the camera 10 is driven (#80) and the film 26 is rewound into the film cartridge 20 by the rotation of the spool shaft 24 of the film cartridge 20 (#81), following which, "exposed" is indicated (#82). That is, the indication of "exposed" is shown after completing rewinding the film 26 (#82). Then, the film cartridge 20 waits for being taken out from the camera 10 (#83).

Figure 17:
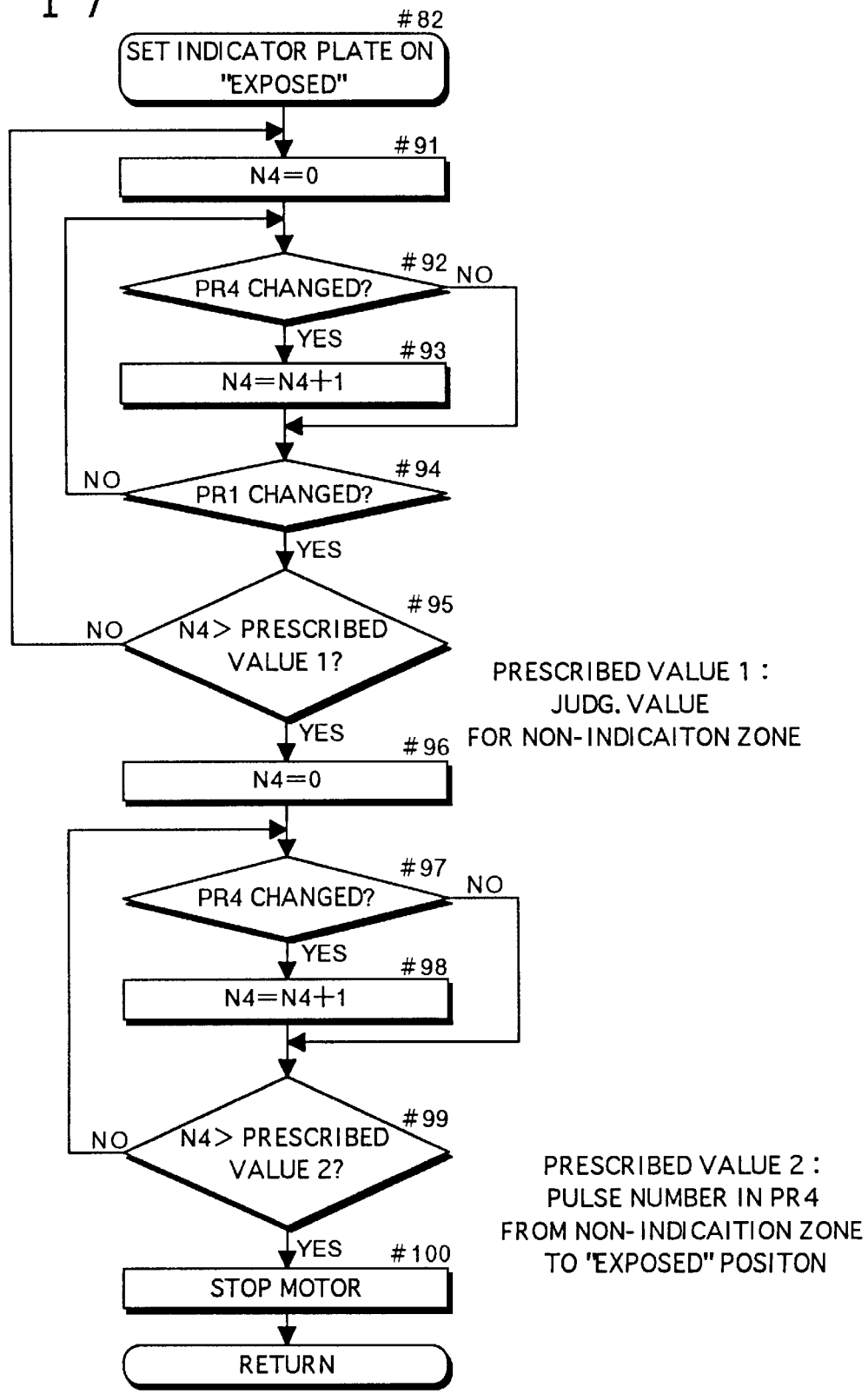
FIG. 17 is a flow chart showing a process for setting a indication showing "exposed".
Figure 18:
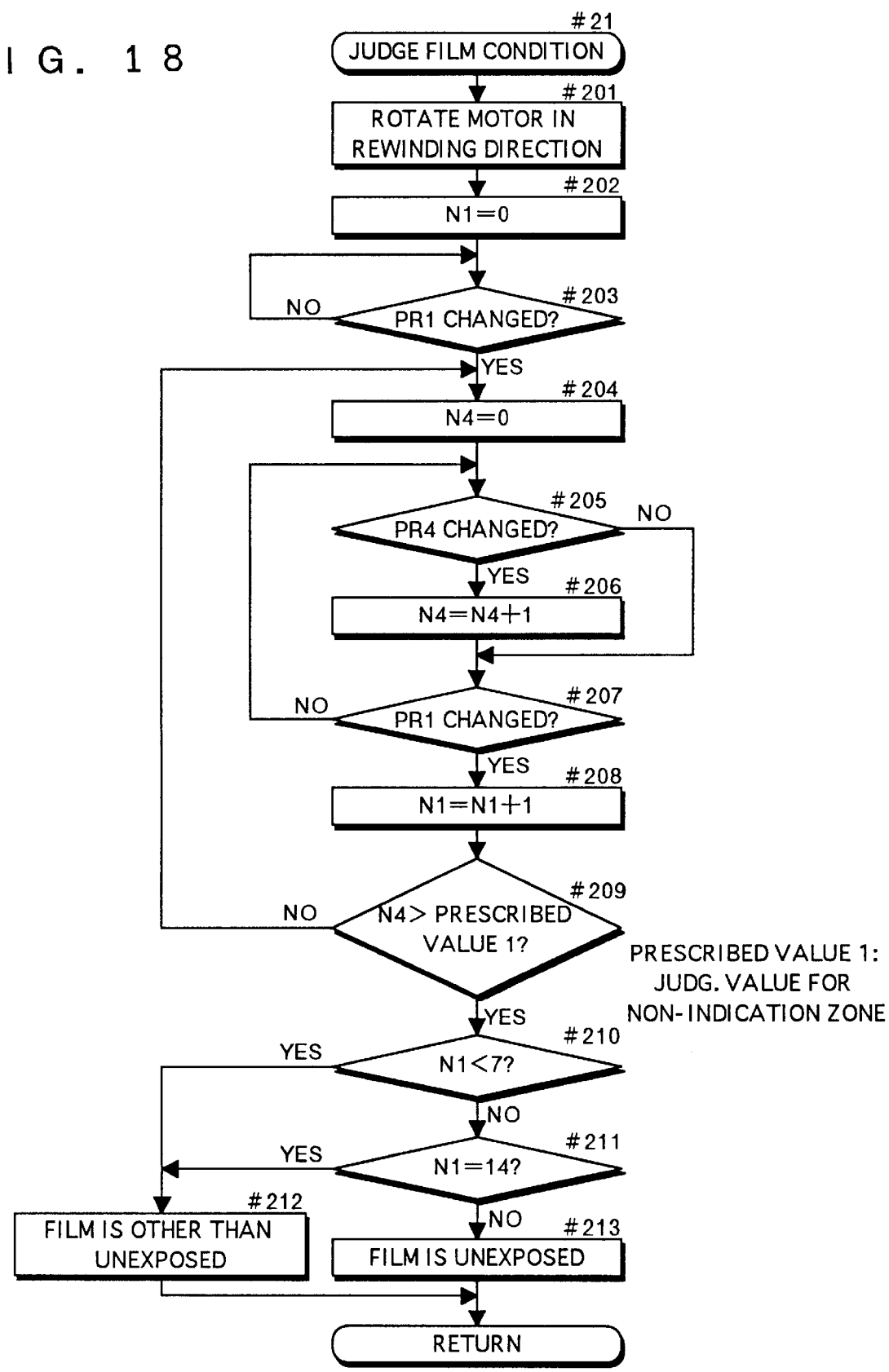
FIG. 18 is a flow chart showing a process for judging a film condition.

The above-mentioned step #82 for setting the indication of "exposed" is executed following a flow chart of FIG. 17. This process is started immediately after detecting the completion of the film rewinding (#80 and #81). At that time, the motor M still rotates, so the indicator plate 50 is rotated. First of all, an initial value 0 is set on the pulse number "N4" of the photo-reflector 14 (PR4) (#91). In the case that the detected value in the PR4 is changed, the "N4" is incremented (#93), and steps from #92 to #93 are repeated until the detected value in the photo-reflector 11 (PR1) is changed (#94). When the detected value in the PR1 is changed, it is examined whether or not the "N4" is larger than a prescribed value 1 that is a judgment value for the non-indication zone 34 (the black-colored segment 48) of the disk 30 (#95). In the case that it is not larger than the prescribed value 1, the operation returns to step #91. In the case that the N4 is larger than the prescribed value 1 in step #95, which means that the non-indication zone 34 is detected, it is examined whether or not the detected value in the PR4 is changed in order to rotate the disk 30 from the non-indication zone 34 to the position for indicating "exposed". In such a case, if the detected value in the PR4 is changed, the "N4" is incremented (#97 and #98), and the motor M is stopped (#100) at the time when the "N4" becomes a prescribed value 2 that is the pulse number from the non-indication zone to the position for indicating "exposed" (YES in #99).

Although the photo-reflector 14 is used in this embodiment in order to detect the non-indication zone 34 based on the output value from the photo-reflector 11, and also detect that the motor rotates for the prescribed amount, it is also possible to reduce the costs by substituting a timer for it.

Figure 19:
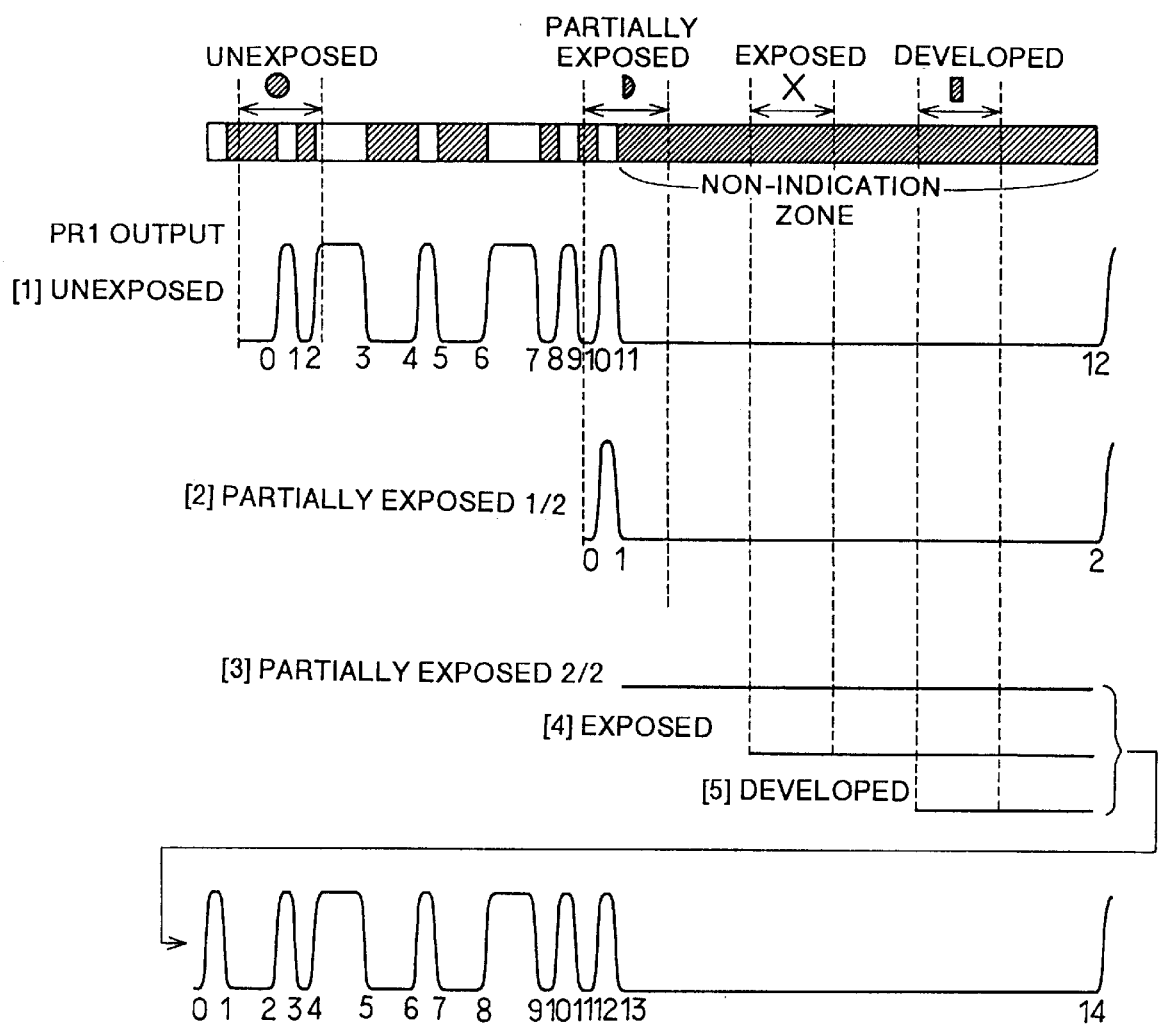
FIG. 19(a) shows a development chart of the bar code disk, and time charts of a waveform of a sensor output in a ideal case.
FIG. 19(b) shows a relation between film conditions and changing times of the sensor output.

As for an operation for judging the film condition (#21) in the above-mentioned flow chart of FIG. 16, its ideal case will be explained referring to FIG. 18 and FIG. 19. A process for judging the film condition is started with driving the motor M to rotate the spool shaft 24 of the film cartridge 20 and to rewind the film 26 into the film cartridge 20, thereby the disk 30 is rotated (#201). Then, the initial value 0 is set on N1: changing times of the edges of the bar codes detected by the photo-reflector 11 (PR1) (#202).

During the above-mentioned rotation of the disk 30, the photo-reflector 11 detects the changes (edge change) of the leading and trailing of the bar code signal which correspond to changes from the bar to the space, or from the space to the bar of the disk 30, and thereby the N1 is counted. At the same time, the motor rotation amount from the edge change to the next edge change is counted with the pulse number "N4" of the photo-reflector 14 (PR4). Then, the detected motor rotation amount is compared with a prescribed threshold value 1 (judgment value for the non-indication zone) for the "N4" (from #203 to #209). If the "N4" is smaller than the threshold value, the above-mentioned steps from #204 to #209 are repeated. If it is larger than the threshold value, it is judged whether or not the "N1" is within a prescribed range in order to judge the film condition (from #210 to #211). In the case that the "N1" is smaller than the prescribed value 7, or in the case that the prescribed value is 14, the film condition is judged other than "unexposed" (#212). In the case except the above-mentioned cases, the film condition is to be judged "unexposed" (#213) (the reason will be described later).

The above-mentioned process for judging the film condition can be achieved by utilizing that the bar codes on the disk's upper surface 30a is structured according to the previously-described rules. As shown in FIG. 6 and FIG. 7, since the angle of the non-indication zone 34 is far larger than that of the bars 36, 38, and the spaces 35, 41, or the like in other zones, it is possible to detect the non-indication zone 34 passing by comparing the pulse number "N4" of the photo-reflector 14 to the prescribed threshold value. Thereby, the initial position of the disk 30 is able to be calculated backward from the "N1."

The operation in the above-mentioned steps from #201 to #203 will be explained with reference to FIGS. 19(a) and 19(b). FIG. 19(a) shows a development chart of the bar codes on the disk's upper surface 30a, and a time chart of waveforms detected by the photo-reflector 11 (PR1) during judging the film condition. FIG. 19(b) shows the N1: the number of times that the detected value in the PR1 changes depending on the film condition until the non-indication zone 34 is detected. Since the stopping position of the disk 30 is uneven to the photo-reflector 11, the initial position of the disk 30 differs depending on the film condition. Therefore, the changing times of the edge until the non-indication zone 34 is detected, is as follows: in the case that the initial position is in the position for "unexposed", N1=9 to 12, and in the case that the initial position is in the position for other than "unexposed", N1=1 to 2, or N1=14. As shown in the above-mentioned FIG. 18, in the case that the "N1" is smaller than the prescribed value 7, or in the case that the prescribed value is 14, the film condition is judged other than "unexposed" (#212), and in the case except the above-mentioned cases, the film condition is judged "unexposed" (#213).

Now, as for an operation following the above-mentioned steps from #201 to #213, an example in the case of indicating "unexposed" will be concretely explained. The disk 30 rotates from the state shown in FIG. 9 in an anticlockwise direction (film rewinding direction) until the non-indication zone 34 (black colored portion 48) passes through the photo-reflector 11. The photo-reflector 11 successively detects a white-to-black/black-to-white turning part (edge: in which the white-colored segment turns into the black, and vice versa). When it detects the white-to-black turning part in which the first space 37 turns into the bar 38 (#203), the initial value 0 is set on the "N4" (#204), and counting is started (from #205 to #206). When the photo-reflector 11 detects the black-to-white turning part in which the bar 38 turns into the space 39 (#207), the "N1" becomes 1 (#208). Then, the counted value "N4", which is the motor rotation amount during the bar 38 passing, is smaller than the prescribed threshold value 1 (judgment value for the non-indication zone), so the above-mentioned steps from #204 to #209 are repeated. At this time, the output waveform of the PR1 is shown in FIG. 19(*a*). The N1 increases one by one by successively repeating these steps at every detection of the edges (#208). Then, when a rear edge of the black segment 48 is detected, the N1 becomes 11. Since the "N4" which is the motor rotation amount from detecting the front edge of the black segment 48 until detecting the rear edge of the same, is larger than the prescribed threshold value 1 (judgment value for the non-indication zone) (#209), the film condition is judged by examining whether or not the N1 is within the prescribed range when the non-indication zone is detected (#210–#211). At that time, the N1 is 11, so it does not meet both of the requirements: N1<7, N1=14 (NO in both of #210 and #222). Therefore, the film condition is judged "unexposed" (#213).

As for the indications other than "unexposed", the film condition is judged in the same way as discussed above. As shown in FIG. 11, in the case of indicating "exposed", the disk 30 makes one revolution or more, and the N1 which is the number of times that the photo-reflector 11 detects the white-to-black/black-to-white turning point, becomes 14. As shown in FIG. 13, in the case of indicating "developed", the disk 30 also makes one revolution or more, and the N1 becomes 14 just like the above-mentioned case. As shown in FIG. 7, in the case of indicating "partially exposed", since the stopping position of the disk 30 is uneven, the N1 becomes 14, or becomes from 1 to 2 as shown in FIGS. 19(*a*) and 19(*b*).

Therefore, in the cases except that the "unexposed" is indicated, the N1 meets one of the requirements: N1<7, N1=14 (YES in #210 or #211), so the film condition is judged other than "unexposed" (#212).

The above-mentioned operations are executed under the ideal condition. As a matter of fact, after the film cartridge 20 is loaded in the cartridge chamber 16, during a time from starting the motor M drive to engaging the driving shaft of the motor with the spool shaft 24, the rotating movement of the spool shaft 24 may make the disk rotate unsteady. Therefore, in such a case, an error pulse may occur in the output of the photo-reflector 11.

Figure 20:
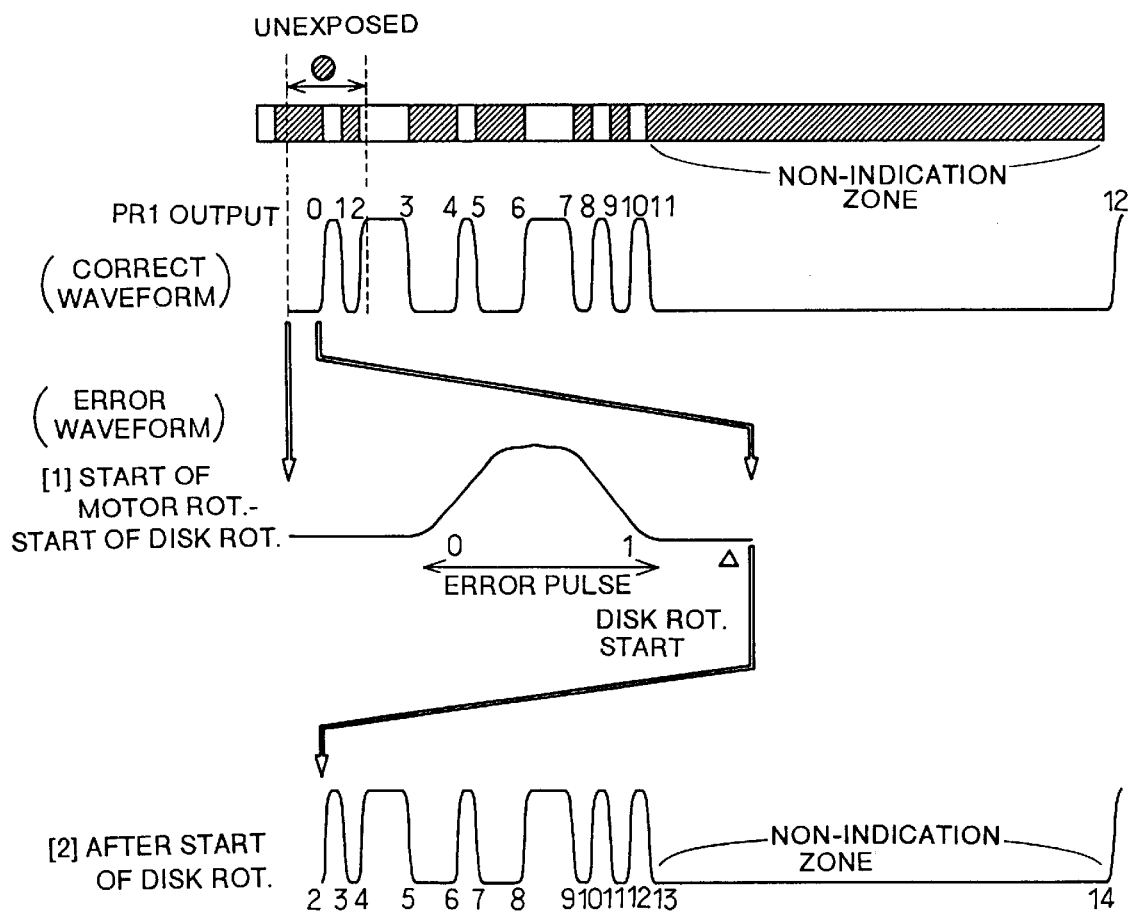
FIG. 20(a) is a development chart of the bar code disk, and time charts of a normal waveform and an abnormal waveform of the sensor output.
FIG. 20(b) is an explanatory view of an operation for detecting the abnormal waveform.
Figure 20:
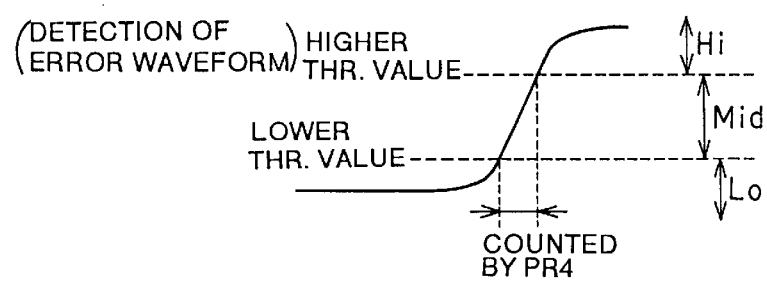

FIGS. 20(*a*) and 20(*b*) shows the example. FIG. 20(*a*) shows that, when the film cartridge containing the "unexposed" film is loaded in the camera, and then the film condition judging process is executed, there occur two cases: one is the case in which a "correct waveform" is output in the PR1 output, and the other is the case in which an "error waveform" is output. There may occur the error waveform shown by 0–1 in [1] of FIG. 20(*a*) by the time the first edge is detected after the motor is driven to rotate the disk. Even in such a case, if the disk rotates correctly after that, the correct waveform is output following the error waveform. Then, in the film condition judging steps from #201 to #213 shown in FIG. 18, the "N1" becomes 14, so the film condition is judged other than "unexposed" in spite of the fact that the film cartridge containing the "unexposed" film is loaded.

In this embodiment, by means of distinguishing the correct waveform from the error waveform, and so canceling the error waveform, the error judgment for the film condition can be prevented. In order to cancel (not count) the error waveform, as shown in "DETECTION OF ERROR WAVEFORM" of FIG. 20(*b*), the output from the photo-reflector 11 is classified into 3 levels: Hi (high), Mid (middle) and Lo (low), and a motor rotation amount in the Mid zone for the edge changing (from Hi to Lo, or from Lo to Hi) is counted by the photo-reflector 14 (PR4). In the case that the counted amount is larger than the prescribed motor rotation amount, it is recognized as the error waveform, and the edge change is canceled.

Figure 21:
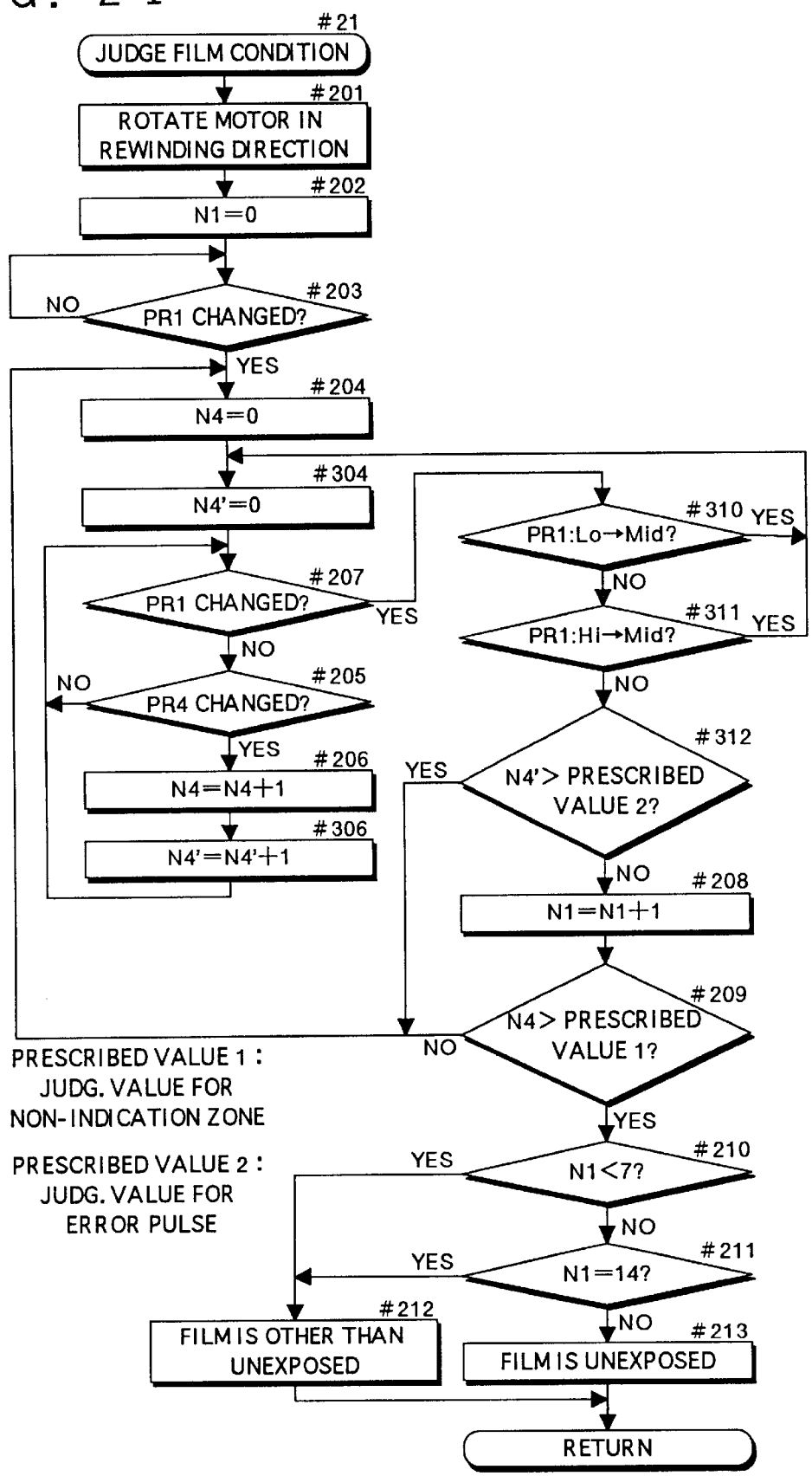
FIG. 21 is a flow chart of a process for judging a film condition.

The film condition judging process including the above-mentioned detection of the error waveform will be explained referring to a flow chart of FIG. 21. In FIG. 21, the same steps as those of FIG. 18 are denoted by the same step numerals (#numbers), and steps #304, #306, #310, #311 and #312 are added. The film condition judging process is started with rotating the spool shaft 24 of the film cartridge 20 in the direction that the film 26 is rewound into the film cartridge 20, and so the disk 30 is also rotated (#201). Then the initial value 0 is set on the N1 (#202). During the rotating movement of the disk 30, the photo-reflector 11 (PR1) detects the edge changes of the bar code signals which correspond to the changes from the bar to the space, or from the space to the bar of the disk 30. Thereby, the "N1" which is the changing times from Mid to Lo, or from Lo to Mid, is counted, and at the same time, the motor rotation amount for the edge changing from Lo to Mid and that from Mid to Hi, or the motor rotation amount for the edge changing from Hi to Mid and that from Mid to Lo, are counted with the pulse number "N4" of the photo-reflector 14 (PR4). Then the "N4'" is compared with the prescribed threshold value 2 (judgment value for the error pulse) at the every edge change from Mid to Lo, or from Mid to Hi (#304–#312).

If the N4' is larger than the threshold value 2 (YES in #312), it is canceled as the error pulse, and the previously-mentioned steps from #304 to #312 are repeated. If it is smaller than the threshold value 2 (NO in #312), it is recognized as the correct pulse. At the same time, the motor rotation amount from the edge change (from Mid to Lo, or from Mid to Hi) to the next edge change, is counted with the pulse number "N4" of the photo-reflector 14 (PR4), and the "N4" is compared with the prescribed threshold value 1 (judgment value for the non-indication zone) at the every detection of the correct edge changes (#204–#209). If the N4 is smaller than the threshold value 1, the above-mentioned steps from #204 to #209 are repeated. If it is larger than the threshold value 1, it is judged whether or not the "N1" (correct changing times) is within the prescribed range (#210–#211). When the "N1" is smaller than the prescribed value 7, or the prescribed value is 14, the film condition is judged other than "unexposed" (#212). In the case except the previously-mentioned cases, it is judged "unexposed" (#213).

Provided that the above-mentioned case concerning the error wave form shown in FIG. 20(*a*) is applied to the above-mentioned film condition judging steps, as for the first edge change (0 in [1]) and the second one (1 in [1]), since the motor rotation amount "N4'" in the Mid zone is larger than the prescribed threshold value 2 (judgment value for the error pulse), it is canceled as the error pulse, therefore, the "N1" becomes 12, and the film condition is correctly judged "unexposed." Thus, the inclination in the output waveform is detected by detecting the output of the photo-reflector 11 at plurality of times, so it is possible to recognize the error waveform.

In this embodiment, the detection pulse of the photo-reflector 14 is used in order to detect the non-indication zone 34 (black-colored segment 48) of the disk 30 and further detect the inclination in the output waveform of the PR1, so that a correct judgment can be achieved regardless of the motor rotation speed. Moreover, a timer can be used instead of the motor rotation speed, which makes it possible to further reduce the costs.

Now, the second embodiment of the present invention will be explained referring to the drawings.

Figure 22:
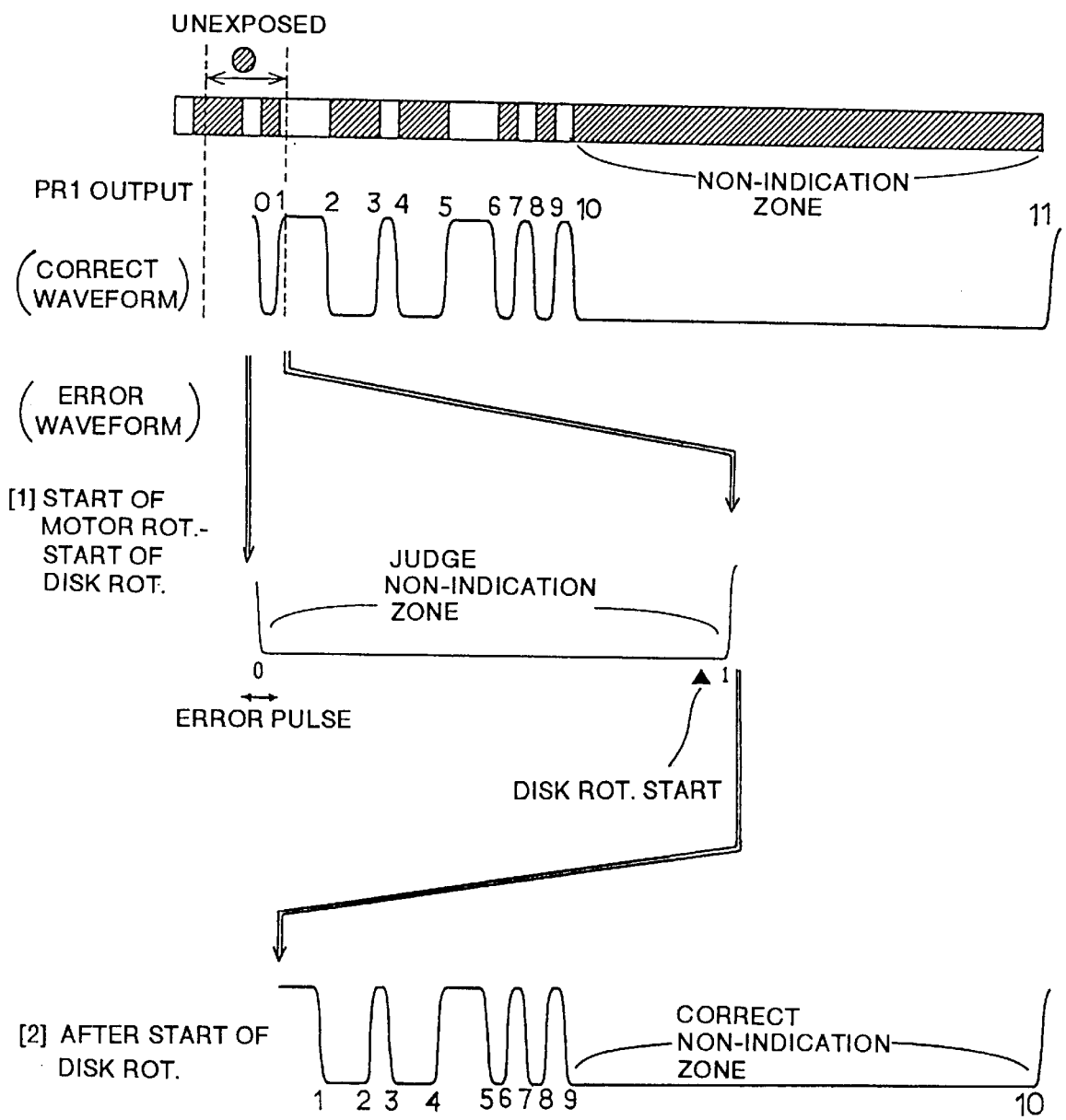
FIG. 22 shows a development chart of the bar code disk and time charts of a normal waveform and an abnormal waveform of the sensor output in the second embodiment of the present invention.

FIG. 22 shows a development chart of the disk and time charts of a correct waveform and an error waveform. During a time from starting the motor rotation to starting the disk rotation, the disk may slightly rotate, which may bring a first edge change, so there may cause an error waveform shown in the figure. After that, when the disk is started to rotate, the correct waveform is detected following a second edge change. At that time, in the film condition judging steps from #201 to #213 shown in the above-mentioned FIG. 18, when the second edge change is detected, the "N4" which is the pulse number from a first edge change to a second one, is larger than the prescribed threshold value (judgment value for the non-indication zone), so an error detection is executed for the non-indication zone. Then the "N1" becomes 1, so the film condition is judged other than "unexposed" in spite the fact that the film cartridge containing the "unexposed" film is loaded.

In this embodiment, it is detected whether or not the non-indication zone which is detected in the first judgment, is the correct non-indication zone, thereby the error judgment can be prevented. For the purpose of it, a waveform following the error waveform (the "ERROR WAVEFORM" in the figure) should be particularly noted. If the non-indication zone which is detected in the first judgment, is the correct non-indication zone, the disk should be always in the same position regardless of the film condition immediately after completing the film condition judgment, and the N1 (changing times of the edges) should be always 14 (corresponding one revolution) until the next non-indication zone is detected. On the other hand, as shown in FIG. 19, only in the case that the non-indication zone is erroneously detected in the first judgment when the film cartridge containing the "unexposed" film is loaded, the N1 should always become the number other than 14 until the next non-indication zone is detected.

Furthermore, in the case that the non-indication zone is erroneously detected in the first judgment when the film cartridge containing the "unexposed" film is loaded, the changing times of the edges until the next non-indication zone is detected, becomes a value of subtracting the changing times of the edges in error detection of the non-indication zone at the first judgment from the changing times 9–12 until the correct non-indication zone. Explaining the example referring to the "ERROR WAVEFORM" shown in the figure, the changing times of the edges becomes 10 (11−1=10). When the film condition is judged other than "unexposed" in the first judgment, the film condition can be correctly judged even in the case that the non-indication zone is erroneously detected based on the error waveform shown in FIG. 22, by means of executing the second judgment for confirmation.

Figure 23:
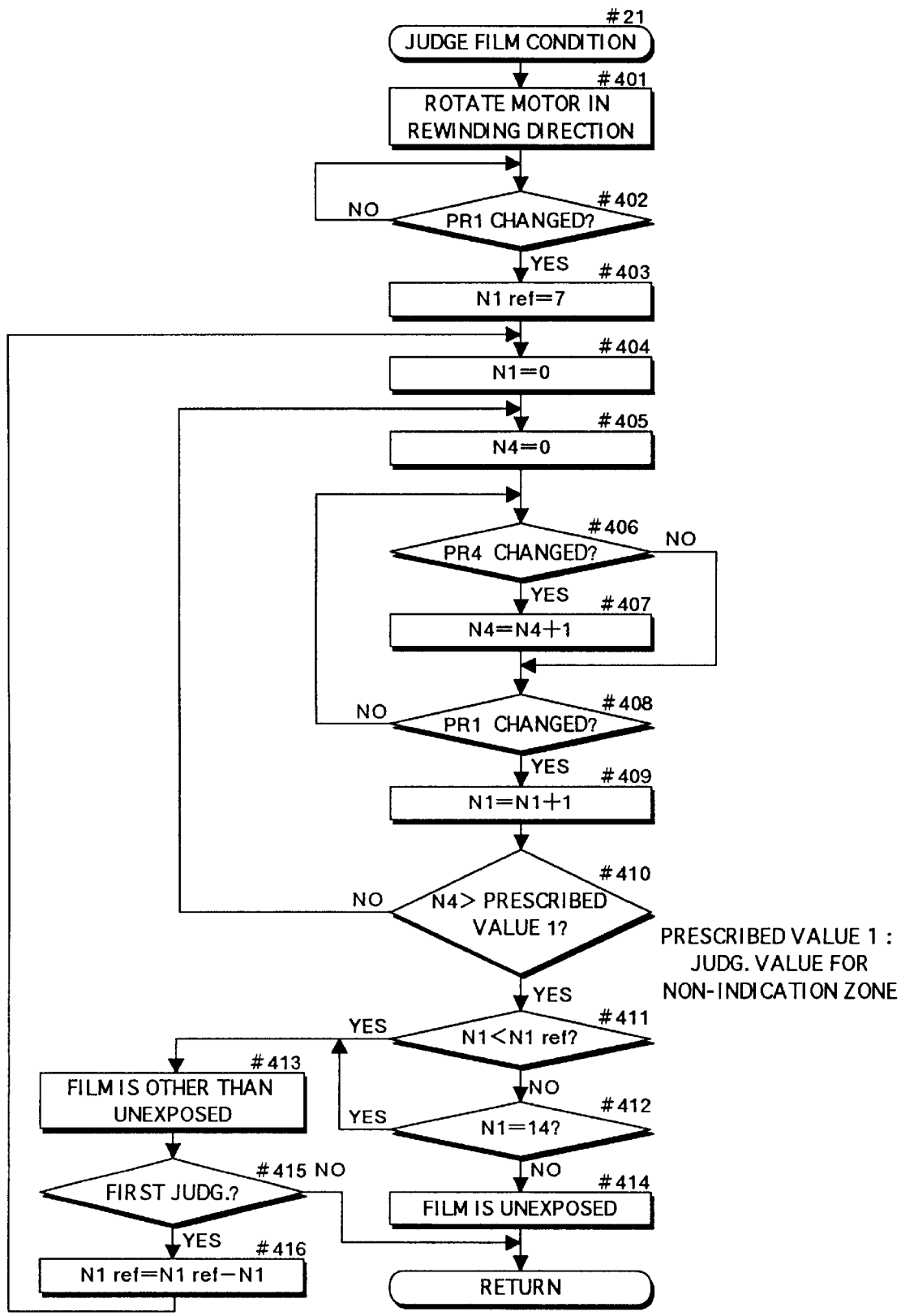
FIG. 23 is a flow chart showing a process for judging a film condition in the second embodiment.

The film condition judging process including the above-mentioned detection for the error waveform will be explained with reference to a flow chart of FIG. 23. In the figure, the film condition judging process is started with rotating the spool shaft 24 of the film cartridge 20 in the direction that the film 26 is rewound into the film cartridge 20, and so the disk 30 is rotated unitedly therewith (#401). After the first edge change is detected by the photo-reflector 11 (PR1) (#402), the initial value 7 is set on the N1 ref (#403).

Then, the initial value 0 is set on the N1 and the N4 (#404 and #405). After that, the edge changes are counted. While counting the changing times of the edges by the photo-reflector 11, the time interval from the edge change to the next edge change is counted with the pulse number "N4" of the photo-reflector 14 (PR4). The "N4" is compared with the prescribed threshold value 1 (judgment value for the non-indication zone) at every detection of the edge change (#606–#410). If the "N4" is smaller than the threshold value 1, the above-mentioned steps from #405 to #410 are repeatedly executed. If it is larger than the threshold value 1, it is judged whether or not the changing times "N1" is within the prescribed range (#411–#412). If the "N1" is smaller than the N1 ref (the initial value is still 7 in the first judgment), or the initial value is 14, the film condition is judged other than "unexposed" (#413), in the case except the above-mentioned cases, it is judged as "unexposed" (#414).

When the film condition is judged other than "unexposed" (#413), it is judged whether or not the judgment is the first one or not (#415). If the judgment is the first one, the value of subtracting the N1 in the first judgment from the N1 ref, is set on the N1 ref in order to execute the second judgment (#416), following which, steps from #404 to #415 are repeated. If the judgment is the second one, the film condition is correctly judged other than "unexposed". In the above-mentioned step #416, by means of setting the N1 ref again, the threshold value is lowered by N1 which is already counted in the detection of the error waveform, so the detection accuracy can be raised.

Here, an example of applying the error waveform shown in FIG. 22 to the above-mentioned steps from #401 to #416 will be explained. If the non-indication zone is erroneously detected in the first judgment, and the "N1" becomes 1, smaller than the N1 ref, the film condition is judged other than "unexposed" (#413). However, in such a case, the second judgment is executed under the condition that the N1 ref is 6 (7−1=6) (#416), therefore the "N1" becomes 10. Thus, both of the requirements: N1<N1 ref (=6) and N1=14, are not satisfied, so the film condition can be judged "unexposed" (#414).

In this embodiment, only in the case that the judgment is other than "unexposed", the bar codes are detected until the next non-indication zone is detected, and then, the second judgment are executed. Therefore, the consumption of an electric current can be reduced, and the initializing time can be also reduced. Further, in this embodiment, the photo-reflector 14 (PR4) is used in order to detect the time interval from the edge change to the next edge change in the disk 30 based on the output from the photo-reflector 11, and further, detect the non-indication zone 34. However, if the motor rotation amount is stable, its costs can be further reduced by substituting a timer.

Figure 24:
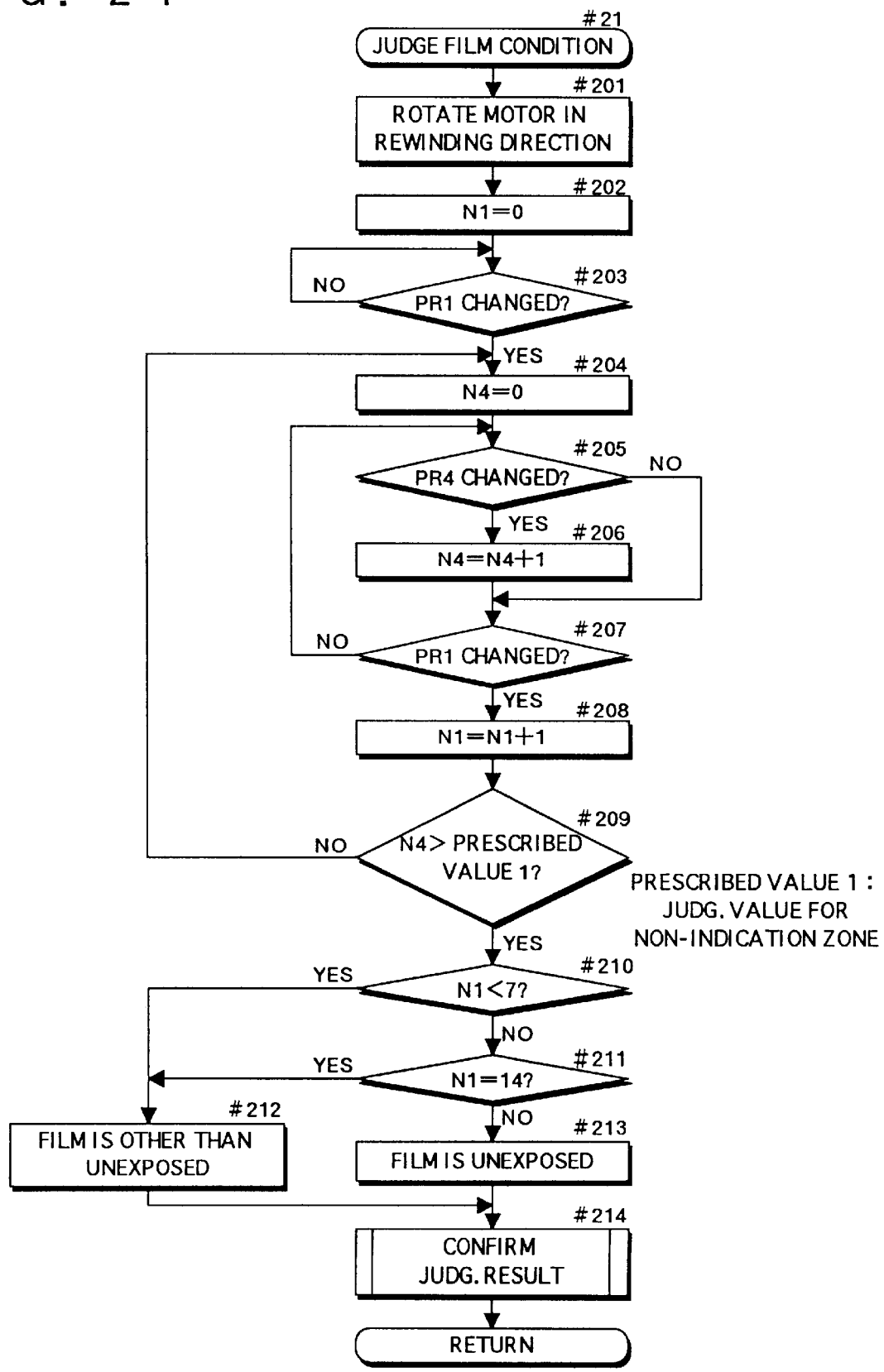
FIG. 24 is a flow chart showing a process for judging a film condition in the third embodiment.

Next, the film condition judging process in the third embodiment will be explained referring to flow charts shown in FIG. 24 and FIG. 25. In the above-mentioned embodiment, only in the case that the first judgment is other than "unexposed", the second judgment is executed for confirmation. However, in following embodiment, the first judgment is always confirmed by the second judgment. Steps from #201 to #213 of FIG. 24 are the same steps denoted by the same numerals in FIG. 18, and a sub-routine for the confirmation of the judgment result is executed (#214) following the judging steps #212 and #213.

Figure 25:
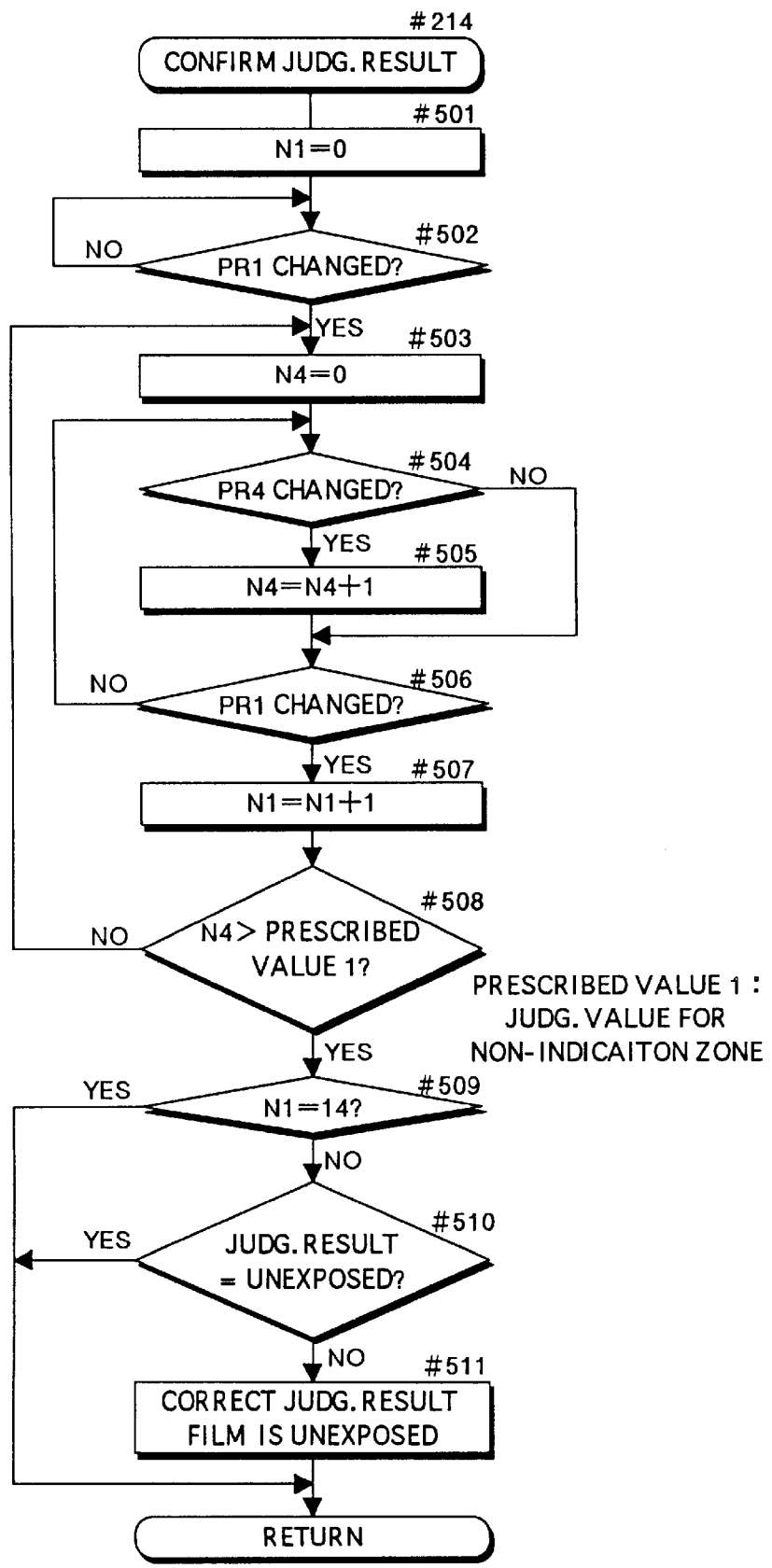
FIG. 25 is a sub-routine in the case shown in FIG. 24.

FIG. 25 shows the sub-routine for the confirmation of the judgment. In the figure, steps from #501 to #508 correspond to steps from #202 to #209, and no explanation is provided thereof. If the N4 is larger than the prescribed value 1 in step #508, and the non-indication zone is detected, it is examined whether or not the N1 is 14 (#509). In the case that it is 14, the film condition is judged other than "unexposed", so the first judgment is considered correct. In the case that the N1 is not 14, it is examined whether or not the first judgment result is "unexposed" (#510). If it is "unexposed", the first judgment is considered correct. On the other hand, if it is other than "unexposed", the first judgment is considered error, and its judgment is corrected into "unexposed" (#511). Thus, it is checked by the second judgment whether or not the result of the first judgment is correct.

As many apparently widely different embodiments of this invention may be made without departing from the spirit and scope thereof, it is to be understood that the invention is not limited to the specific embodiments thereof except as defined in the appended claims.

What is claimed is:

1. An apparatus having a film condition judging device which judges a used condition of a film based on data obtained by reading out bar codes of a bar code disk equipped on a film cartridge, wherein the bar code disk is initially stopped at a predetermined rotational position in response to the used condition of the film, comprises:

a reading out sensor which reads out the bar codes of the bar code disk;

an inclination detector which detects output from the reading out sensor at a plurality of times during rotation of the bar code disk and detects inclination changes of the sensor's output based on the sensor's detected output and intervals between the detecting times;

a counter which counts the sensor's output as a correct signal when the inclination which is detected by the inclination detector is a prescribed value or more, and does not count the sensor's output when the inclination is less than the prescribed value; and, a judging device which judges the used condition of the film based on a counted value by the counter.

2. The apparatus as claimed in claim 1, wherein the apparatus is a camera.

3. The apparatus as claimed in claim 1, wherein the used condition of the film includes an exposed, an unexposed, a partially exposed, and a developed condition.

4. An apparatus having a film condition judging device which judges a used condition of a film based on data obtained by reading out bar codes of a bar code disk equipped on a film cartridge, wherein the bar code disk is initially stopped at a predetermined rotational position in response to the used condition of the film, comprises:

a reading out sensor which reads out the bar codes of the bar code disk;

a motor rotation amount detector which detects a rotation amount of a motor which drives the bar code disk to rotate;

an inclination detector which detects output from the reading out sensor at a plurality of times during rotation of the bar code disk and detects inclination changes of the sensor's output based on the sensor's detected output and pulse numbers which are detected by the motor rotation amount detector;

a counter which counts the sensor's output as a correct signal when the inclination which is detected by the inclination detector is a prescribed value or more, and on the other, does not count the sensor's output when the inclination is less than the prescribed value; and, a judging device which judges the used condition of the film based on a counted value by the counter.

5. The apparatus as claimed in claim 4, wherein the apparatus is a camera.

6. The apparatus as claimed in claim 4, wherein the used condition of the film includes an exposed, an unexposed, a partially exposed, and a developed condition.

7. An apparatus having a film condition judging device which judges a used condition of a film based on data obtained by reading out bar codes of a bar code disk equipped on a film cartridge, wherein the bar code disk is initially stopped at a predetermined rotational position in response to the used condition of the film, comprises:

a reading out sensor which reads out the bar codes of the bar code disk;

a counter for counting the sensor's output;

a detector which detects a non-indication zone of the bar code disk based on a bar code detected signal which is output from the reading out sensor;

and, a judging device which judges the used condition of the film based on number of the bar codes counted by the counter until a first non-indication zone is detected after a motor which drives the bar code disk is ON, and confirms whether the judgment result is correct based on number of bar codes counted by the counter until a second non-indication zone is detected.

8. The apparatus as claimed in claim 7, wherein the film condition judging device confirms the judgment result only in case that the film condition is judged other than unexposed.

9. The apparatus as claimed in claim 8, wherein the film condition judging device corrects the judgment result according to a result of a confirmation of the device.

10. The apparatus as claimed in claim 7, wherein the film condition judging device corrects the judgment result according to a result of a confirmation.

11. The apparatus as claimed in claim 7, wherein the apparatus is a camera.

12. The apparatus as claimed in claim 7, wherein the used condition of the film includes an exposed, an unexposed, a partially exposed, and a developed condition.

13. An apparatus capable of film judgement in which a used condition of a film based on data obtained by reading out bar codes on a bar code disk equipped on a film cartridge, wherein the bar code disk is initially stopped at a predetermined rotational position in response to the used condition of the film, comprising:

a reading out sensor which reads out the bar codes of the bar code disk; and a microcomputer which carries out an inclination detection in which output from the reading out sensor is detected at a plurality of times during rotation of the bar code disk and inclination of the rising/falling of the output is detected based on the sensor's output and intervals between the detected times; a count in which the sensor's output is counted as a correct signal when the detected inclination is a prescribed value or more, and is not counted when the inclination is less than the prescribed value; and a judgement in which the used condition of the film is judged based on the counted value.

14. The apparatus as claimed in claim 13, wherein the apparatus is a camera.

15. The apparatus as claimed in claim 13, wherein the used condition of the film includes an exposed, an unexposed, a partially exposed, and a developed condition.

16. The apparatus according to claim 13, wherein said microcomputer carries out said inclination detection, said count and said judgement together with cooperative circuits.

17. An apparatus capable of film judgement in which a used condition of a film based on data obtained by reading out bar codes on a bar code disk equipped on a film cartridge, wherein the bar code disk is initially stopped at a predetermined rotational position in response to the used condition of the film, comprising:

a reading out sensor which reads out the bar codes of the bar code disk;

a microcomputer which carries out a motor rotation detection in which a rotation amount of a motor which drives the bar code disk is detected; an inclination detection in which output from the reading out sensor is detected at a plurality of times during rotation of the bar code disk and inclination of the rising/falling of the output is detected based on the sensor's output and pulse numbers detected in the motor rotation detection; a count in which the sensor's output is counted as a correct signal when the detected inclination is a prescribed value or more, and is not counted when the inclination is less than the prescribed value; and a judgement in which the used condition of the film is judged based on the counted value.

18. The apparatus as claimed in claim 17, wherein the apparatus is a camera.

19. The apparatus as claimed in claim 17, wherein the used condition of the film includes an exposed, an unexposed, a partially exposed, and a developed condition.

20. The apparatus according to claim 17, wherein said microcomputer carries out said motor rotation detection, said inclination detection, said count and said judgement together with cooperative circuits.

21. The apparatus according to claim 17, wherein said microcomputer carries out said detection, said judgement and said confirmation together with cooperative circuits.

22. An apparatus capable of film judgement in which a used condition of a film based on data obtained by reading out bar codes on a bar code disk equipped on a film cartridge, wherein the bar code disk is initially stopped at a predetermined rotational position in response to the used condition of the film, comprising:

a reading out sensor which reads out the bar codes of the bar code disk;

a microcomputer which carries out counting of the sensor's output; a detection in which a non-indication zone of the bar code disk is detected based on the signal detected by said reading out sensor; a judgement in which the used condition of the film is judged based on a number of the bar codes counted until a first non-indication zone is detected after a motor which drives the bar code disk is ON; and a confirmation whether the judging result is correct based on a number of bar codes counted until a second non-indication zone is detected.

23. The apparatus according to claim 22, wherein said confirmation is carried out only in case the film condition is judged other than unexposed.

24. The apparatus according to claim 23, wherein said microcomputer further carries out a correction in which the judgement result is corrected according to the result of the confirmation.

25. The apparatus according to claim 22, wherein said microcomputer further carries out a correction in which the judgement result is corrected according to the result of the confirmation.

26. The apparatus as claimed in claim 22, wherein the apparatus is a camera.

27. The apparatus as claimed in claim 22, wherein the used condition of the film includes an exposed, an unexposed, a partially exposed, and a developed condition.

* * * * *